United States Patent [19]

Fujimura

[11] 4,020,473
[45] Apr. 26, 1977

[54] AUTOMATIC SYSTEM FOR PROVIDING TELEPHONE NUMBER INFORMATION SERVICE

[76] Inventor: Eiji Fujimura, 24-4, Shinohara-dai, Kohuku Yokohama, Japan

[22] Filed: Dec. 22, 1975

[21] Appl. No.: 642,760

Related U.S. Application Data

[63] Continuation-in-part of Ser. No. 396,306, Sept. 11, 1973, abandoned, which is a continuation of Ser. No. 162,236, July 13, 1971, abandoned, which is a continuation-in-part of Ser. No. 834,226, June 11, 1969, abandoned, which is a continuation-in-part of Ser. No. 730,973, April 25, 1968, abandoned, which is a continuation-in-part of Ser. No. 438,325, March 9, 1965, abandoned.

[30] Foreign Application Priority Data

Mar. 11, 1964 Japan ............................. 39-13453

[52] U.S. Cl. ........................................... 340/172.5
[51] Int. Cl.² ................... G06F 7/10; G06F 15/02; G06F 15/40
[58] Field of Search ............................... 340/172.5

[56] References Cited
UNITED STATES PATENTS

| | | | |
|---|---|---|---|
| 3,242,470 | 3/1966 | Hagelbarger et al. | 340/172.5 |
| 3,345,612 | 10/1967 | Goldman | 340/172.5 |
| 3,448,436 | 6/1969 | Machol, Jr. | 340/172.5 |
| 3,715,730 | 2/1973 | Smith et al. | 340/172.5 |

Primary Examiner—Melvin B. Chapnick
Attorney, Agent, or Firm—Lowe, King, Price & Markva

[57] ABSTRACT

In an automatic telephone information retrieval system, each subscriber entry is encoded according to primary name, secondary name, primary address, secondary address, generic occupation and specific occupation. The entire contents of a local telephone directory may be electronically stored at memory addresses based upon the above encoding. Statistical methods are used to ensure a workable distribution of subscriber entries over the available memory addresses. The information is retrieved from memory by successively dividing the memory into "divided down" portions. Division points, which are boundaries between neighboring divisions, are designated in a form directly convertible into address coordinates of a random access core storage to speed information retrieval. Electronic calculating and comparing circuits automatically search the memory as a function of the division points, and also provide rapid and automatic address range computations. The system is geared to operate with incomplete subscriber entry data, and in many instances corrects operator errors.

5 Claims, 22 Drawing Figures

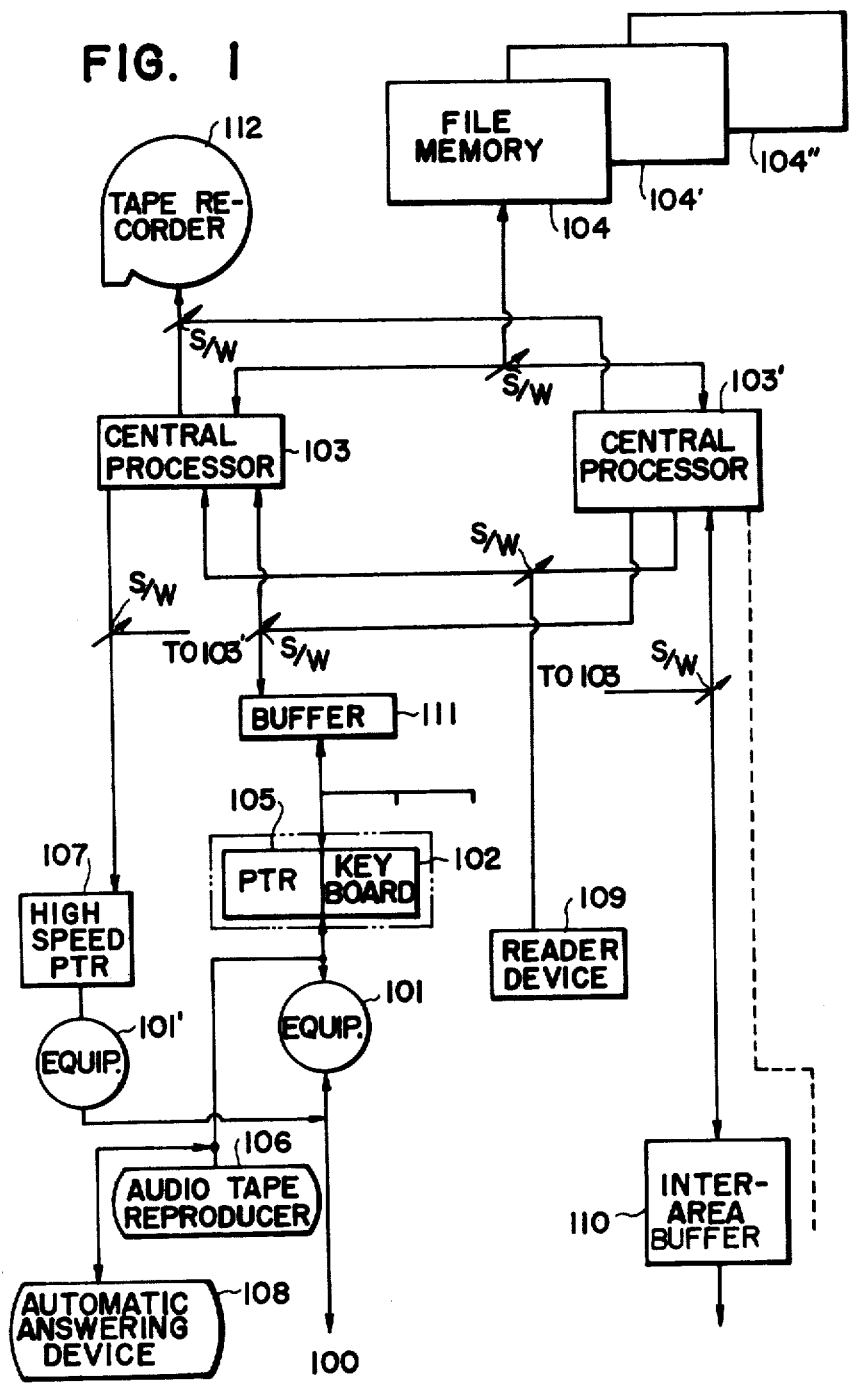

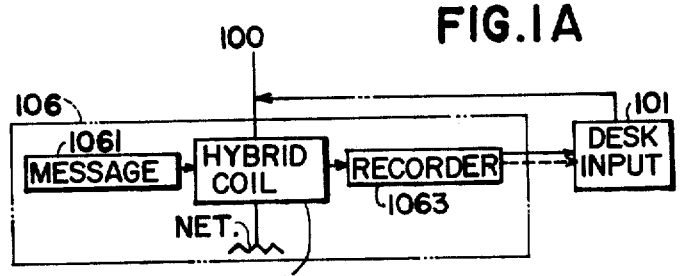
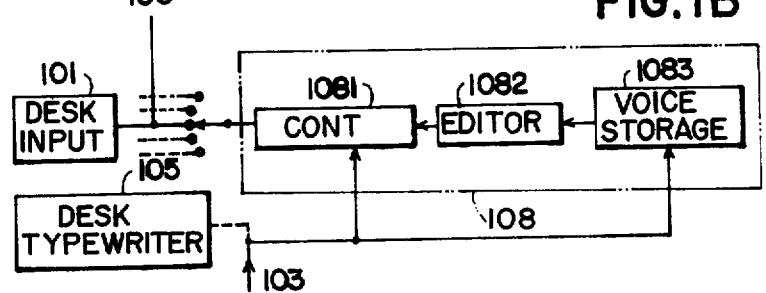

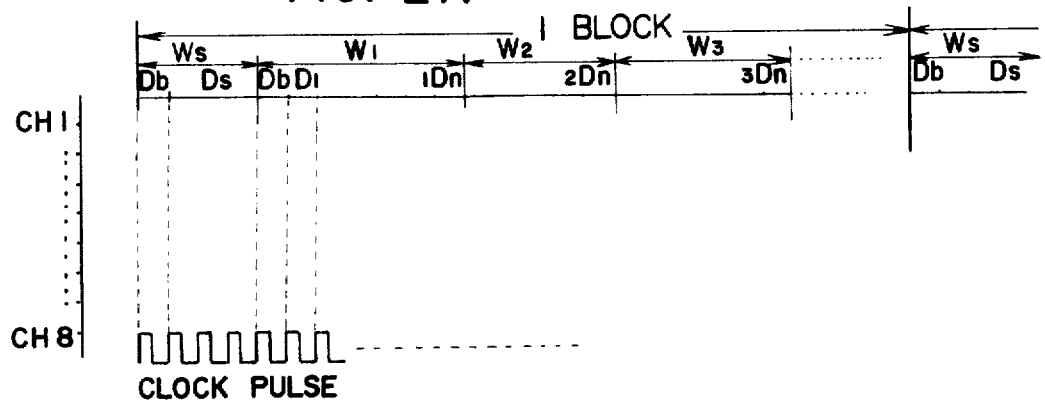
FIG. 2A
FIG. 2B
FIG. 2C
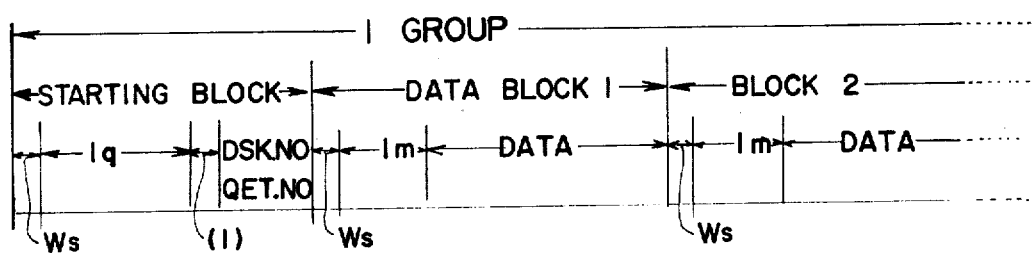
FIG. 2D
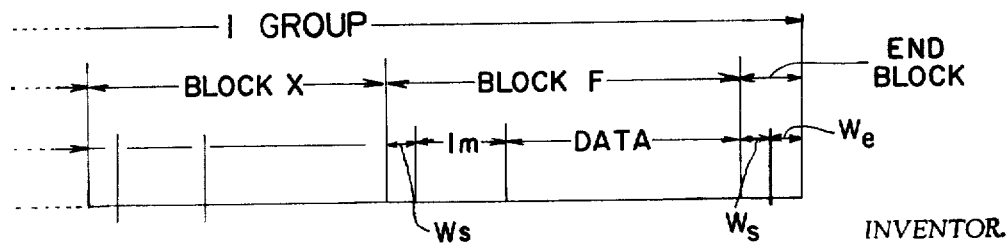
INVENTOR.
BY EIJI FUJIMURA

INVENTOR.

BY EIJI FUJIMURA

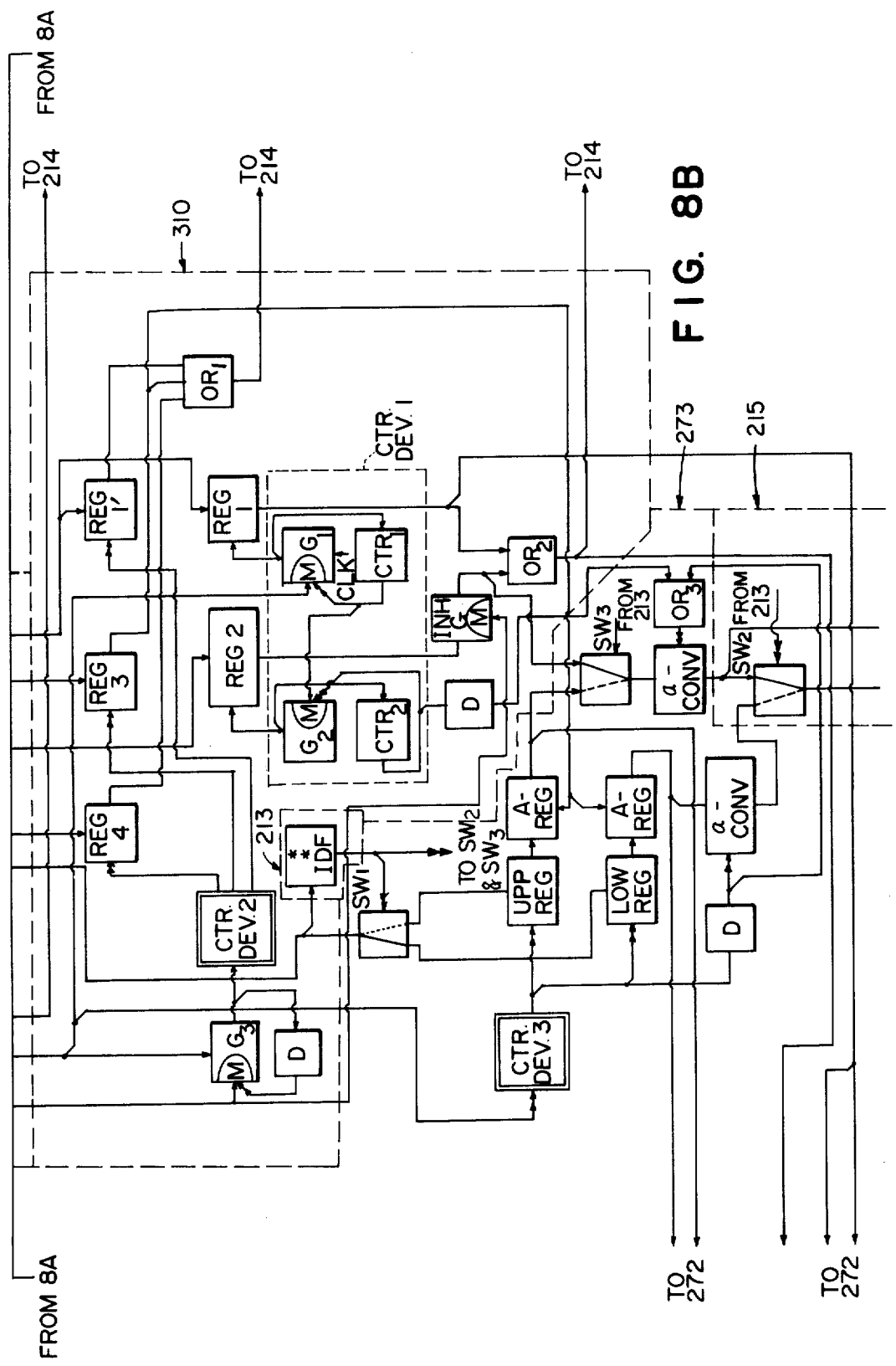

AUTOMATIC SYSTEM FOR PROVIDING TELEPHONE NUMBER INFORMATION SERVICE

CROSS-REFERENCE TO RELATED APPLICATION

This application is a continuation in-part of my U.S. patent application Ser. No. 396,306, filed Sept. 11, 1973, which in turn is a Continuation of my U.S. application Ser. No. 162,236, filed July 13, 1971, which, in turn, is a continuation-in-part of my U.S. application Ser. No. 834,226, filed June 11, 1969, which, in turn, is a continuation-in-part of my U.S. application Ser. No. 730,937, filed Apr. 25, 1968, which, in turn, is a continuation-in-part of my U.S. patent application Ser. No. 438,325, filed Mar. 9, 1965, all of which are now abandoned.

BACKGROUND OF THE INVENTION

This invention relates generally to automatic information retrieval, and particularly toward a telephone number information system which requires minimum human operator intervention.

A prior art automatic telephone information system is disclosed in U.S. Pat. No. 3,242,470 to Hagelbarber et. al. In that system, the entire contents of a telephone directory are entered, in digitally encoded form, into a computer memory. For retrieval purposes, the directory contents are summarized by coarse indices, each of which covers 200 fine indices. This coarse index is used for an initial search operation which narrows the desired memory location to 1/200 of the total directory. Each of the 200 groups of entries is further subdivide into 200 finer parts represented by fine indices for a further level of searching. Finally, each of the 200 finer parts may be further sub-divided into 50 much finer groups by finer indices. In this way, searching proceeds until it is determined at what address in memory the desired entry will be found. The coarse and fine searching is all done on an alphabetical basis. In case the information supplied to the computer as an inquiry lacks completeness, as is frequently true, the Hagelbarger system does not generate the correct subscriber information (telephone number).

If the inquirer knows the complete and correct spelling of the desired subscriber's name, and if the alphabetical coarse and fine searching discloses the memory address of the desired entry, the next step in the Hagelbarger system is to translate an entire block of telephone information entries found at that memory address into video form, and to display the entire block of information on a video screen for inspection by the information operator. This procedure involves complicated and expensive electronic hardware, and the operator must still read through the displayed block of information.

Moreover, in order to make the print large enough to be read easily on the video screen, only one-eighth of a block of information contained in one memory address is displayed at any time on the video screen. The operator must then manually scan the video "window" across the irrelevant portions of the block of information until the relevant one-eighth portion is located before the operator can begin searching for the specific information desired.

One difficulty in prior art automatic telephone number information service is due to the inaccuracy of the requester's knowledge of the subscriber whose telephone number he is seeking. This difficulty is aggravated by the requirement of rapid, random access of information based on an inaccurate request.

In practice, I have found that the coincidence rate between raw information in an inquiry and that in a directory on the basis of coincidence of each character is shown below.

Name . . . . about 30%
Address (Residence Location) . . . about 13%
Occupation . . . . about 4%

Further, I have found that simultaneous coincidence of name, address, and occupation was about, at most 13%.

Thus, the greater the number of descriptors (keyword items), the lower the answerable rate when the input information is inaccurate.

In Hagelbarger, only the surname is used for the retrieval index. However, in his system, the number of answers becomes larger inversely proportional to the degree to which the index is simplified so that the operator must confront a larger block of data. This requires increased operator intervention.

In some conventional prior art systems, a "randomizing method" is used for randomm access using spoken language. The "randomizing method" breaks down the word pattern into random numerals for memory address by a predetermined mathematical operation. Since the letters in a human name are in a statistically uneven distribution, the result of the randomizing method is insuffiicient to achieve true random distribution of characters. This gives rise to superposition of entries at common locations. Therefore, in the prior art, alphabetical arrangement in regular sequence of file entries is not suitable for direct access retrieval.

Accordingly, one object of the present invention is to provide a new and improved automatic telephone information system.

Another object of the present invention is to provide an automatic telephone information system which does not require digital-to-video conversion equipment.

Another object of the present invention is to provide an automatic telephone information system which will supply a correct answer even when the inquirer does not know the subscriber's exact name, is not sure of the proper description of the subscriber's business, or is not sure of the address.

Another object of the present invention is to provide an automatic telephone information system employing cross-correlation of three independent forms of information, e.g., name, occupation, and address, so as to reduce the number of possible answers that must be considered by the operator.

Another object of the present invention is to provide an automatic telephone information system employing random access file entry, in alphabetical arrangement, without any location gap or any superposition of entries, and which uses a spoken languae index.

Another object of the present invention is to provide a new and improved automatic telephone information system which is faster, requires less operator effort, and compensates for the operator's own errors, as well as the inaccuracy or indefiniteness of the inquirer's information.

SUMMARY OF THE INVENTION

In accordance with the present invention, a correct answer to an inquiry is generated despite inaccuracy or incompleteness of the inquiry request by approaching information retrieval based on a random access concept rather than on a sequential alphabetic concept. Basically, the subscriber index is initially prepared from independent entry data, e.g., name, residence, location and occupation of each subscriber. Some of the indexed items are first converted into generic codes or concepts, and their redundant characters may be truncated.

Some of the entries that are stored at the boundary of two neighboring tracks or unit-areas in a file memory are used as a key-word. The key-words are compared with an inquiry index, prepared from the inquiry information, for searching the address of information stored in the file memory.

As regards data entry, the name of a subscriber is treated as a combination of $N_1$, $N_2$, $N_3$, etc. $N_1$ is the first, or most significant, work in the case of an enterprise, or is the family name in the case of personnel, while $N_2$ is the second, or next most significant word, in the case of an enterprise, or the given name in the case of personnel. For example, with "Alexander Chemical Industry, Inc.", $N_1$ is "Alexander", $N_2$ is "Chemical", while with "George Washington", $N_1$ is "Washington", and $N_2$ is "George".

Residence location data A is a combination of $A_1$, $A_2$, etc. $A_1$ represents the ward name, for example, $A_2$ represents the sub-ward, $A_3$ represents the address number, etc., in cities like Tokyo or London. In cities in the U.S.A., $A_1$ might be the postal-zone, or section of town, $A_2$ might be the specific street therein, etc.

The Occupation of the subscriber is formed of a generic term or concept $O_1$ and a specific term or concept $O_2$.

I have found that, in practice, only the first four or five letters of $N_1$ and $N_2$ are required for searching purposes, although each entry in the index is always of the same fixed work length. The use of a truncated name word of this kind does not result in any significant loss of information, since I have found that the first four or five letters of any name are enough to establish a meaningful coincidence, in accordance to the invention, when the name is also used in conjunction with two other independent terms or concepts such as occupation and residence location cross-correlated therewith. On the other hand, considering th probability of human error, the greater the number of letters of a name which the inquirer is asked to provide, the greater is the likelihood that he will commit human error, and the poorer is the overall reliability of the system.

As a result of the foregoing generic classification or truncation, I have found that the relevancy of each item of inquiry to the registered item is as follows:

Against name coincidence 30%, $N_1$ coincidence 95%, $N_2$ coincidence is 85%.

Against residence location coincidence of 13%, $A_1$ coincidence is 95% of the $N_1$ coincidence above, while $A_2$ coincidence is 68%.

Against a specific occupation coincidence of 4%, O coincidence is 92% after conversion to a generic term code.

With regard to the 5% irrelevancy of error of $A_1$, discussed above, the error is 2%, the unknown by a requester is 2.9%. In the irrelevancy of O of 8%, discussed above, the error is 2.7% while the unknown by a requester is 5.4%, based on generic classification. These are results derived from statistical research at the Tokyo Telephone Number Information Bureau.

In accordance with the present invention, a retrieval index $I_m$ is prepared as a combination of $N_1$, $A_1$, and O which are generic codes or concept term. some of the indices $I_m$ stored in the file memory are picked out as key-words K to be stored in a random access memory, such as a core matrix. Comparison between the inquiry index $I_q$ and the key-words K are made in a comparator. Additional circuitry is provided to scan the file memory using the key-words K stored in the random acces memory with a divisional point search system in accordance with the invention. The division point search system comprises successive divisions by two of keyword data as a function of result of comparison beteen the inquiry indices $I_q$ with the key-word indiices K. Also in accordance with the invention, the number of answers displayed to the operator is reduced by screening with a reduction index comprising the second most significant entries in the inquiry information, i.e., $N_2$ and $A_2$. As a result of the reduction process, the resulting number of answers displayed to the operator is one in nearly all cases in practice.

Since only a single correct answer is generally presented to the information operator, rather than an entire block o data as in the prior art, operator time is saved and the system is made substantially more efficient. Furthermore, since read-out may be printed, rather than displayed on a video screen, the need for complicated and expensive digital-to-video conversion is obviated.

An error correction system is provided to automatically correct some misspelled or erroneous inquiry data. The correction system comprises an error correction storage table containing certain names, addresses, etc., that are very often confused with others. For example, the postal zone of a business located very close to the dividing line between the two zones is often confused with the wrong postal zone. If an inquiry does not yield a result, the storage table is scanned for entries resembling the inquiry entries. Similar data stored in the table are exchanged with corresponding inquiry data and the file memory is again interrogted. The process is continued until either a result is obtained from the memory file or all similar entries in the error correction storage table are used.

More specifically, the system comprises at least one input device for receiving inquiry information including a format control symbol for an inquiring index along with at least one output device to receive information in response to inquiries. At least one random access file memory is included for storing data entries and at least one central processor is provided for carrying out mathematical and logical computation as well as comparisons.

The central processor includes an index shaping device coupled to the input device. The shaping device comprises detector switching means to identify breaks between items in the inquiry and to appropriately direct the inquiry items to register for each item; register means connected with the detector switching means for storing each said item, and to limit the number of characters as to any needed one of said items; conversion means connected to the detector switching means for converting each of the needed items into a corresponding generic concept code; a further register means connected to the conversion means for storing each of the generic concept codes; an integrating register means connected to said register means and said first register means to integrated each item to shape a set of inquiry items comprising an inquiry index, desk and question number, and a format control symbol; a directing means connected to the register means and said further register means parallel with said switching means to recognize a format control symbol in the inquiry information to control the order of transmission of said generic codes from said further register means to said integrating register means; a dividing device coupled to the integrating register means to separate the inquiry index from the set of inquiry items and to register the inquiry index; and a joining device coupled to the dividing device and the output channel of the file memory device to receive and combine the set of inquiry items with response data from the file memory device.

The system also includes a comparison device comprising a random access storage means having storage cells to store keywords that are prepared in the same format as the inquiry index item, and having a control unit; a further storage means to store area-unit numbers corresponding to the keywords and having storage cells corresponding to storage cells in the random access storage means on a one to one basis; comparing means coupled to both the storage means to determine the position of an inquiry index among a plurality of keywords, stored in the random access storage means, which respectiveely correspond to the storing areas of the file memory device; address calculating means connected to the comparing means and the control unit of the random access storage means to calculate the memory address of the next keyword in accordance with a latest comparison result "larger" or "smaller" than the inquiry index; keyword registering means coupled between the random access storage means and the comparing means to receive and store the keywords for the next comparison step; area-built number registering means connected to the file memory device to receive and store areaunit numbers corresponding to the keywords, and to transmit the contents thereof to the memory file device at the time of determination of the inquiry index position amoung the keywords; and a checking device coupled between the joining device and the output device to determine whether or not a response received from the memory file device coincides with the inquiry index as to some particular items, to pass the coincident data through to the output device, and to transmit a signal indicating "No-answer" to the output device when there is no coincident datum.

BRIEF DESCRIPTION OF THE DRAWING

FIG. 1 is a block diagram showing the overall telephone number retrieval system;

FIGS. 1A and 1B respectiively are block diagrams of an auxiliary device for input or output with respect to the system of FIG. 1;

FIG. 2A is a diagram of one signal block and of the relationship of the signal to clock pulses and to channels;

FIG. 2B is a diagram of digest $D_s$ or D;

FIG. 2C is a diagram of word signals $W_s$, $W_e$, and $W_1$ ... $W_n$;

FIG. 2D is a diagram of one group of inquiry data;

FIG. 3A includes a comparison device, a file memory device and accompanying devices, while FIG. 3B includes devices to form or shape the index from inquiry information, a checking device, and index re-forming device and associated devices;

FIG. 8A is a logic block diagram showing the connections among index shaping devices 306, 308, 309, and 310, while FIG. 8B is a logic block diagram showing the configuration of the index shaping devices themselves, such as device 310 in FIG. 3B, and showing the configuration of converting register 273 in the central processor shown in FIG. 3B;

DETAILED DESCRIPTION OF THE PREFERRED EMBODIMENTS

Figure 3A:
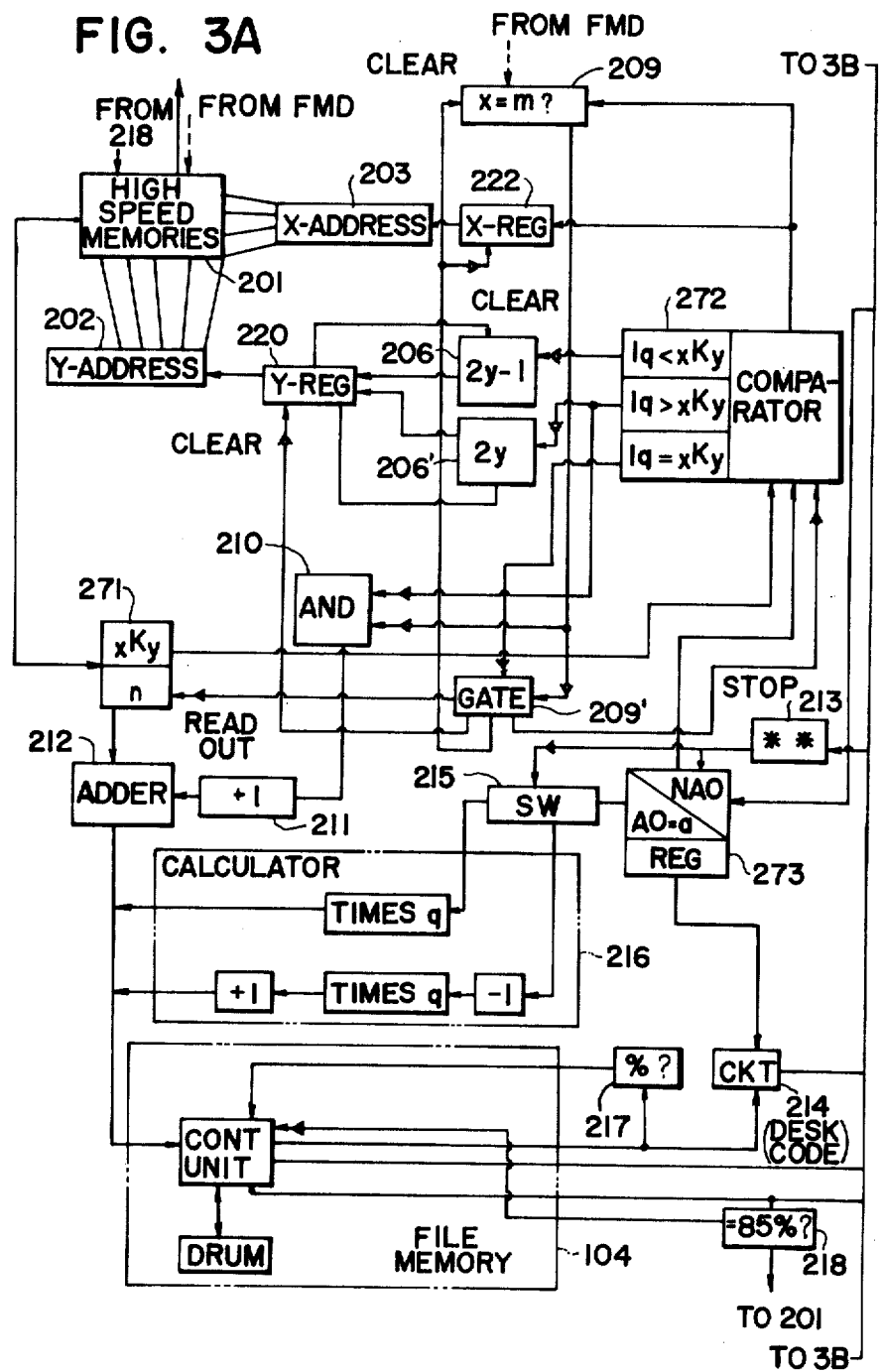
FIGS. 3A and 3B together are a diagram of a central processor used in the system of the present invention.

Referring to FIG. 1, number 100 designates an inquirer or requester. Number 101 designates an operator who receives request for telephone number information service. Number 102 designates an operator console including a keyboard for input of data by the operator. Number 105 designates a printing device for information output to the operator as a standby processor for emergency or overload. Number 104 designates a file memory storing all data entries, and has random access capability. Numbers 104' and 104" designate other file memories which store data entries in different order from file 104. For example, where file 104 stores data entries in the order of NAO, that is, name, residence, location, and occupation, file 104' stores the entries in the order of NOA, while file 104" stores entries in the order OAN. Number 106 desiignates an auxiliary input device, the configuration of which is shown in detail in FIG. 1A. Number 107 designates a high speed output device, e.g., a line printer. Number 108 designates an output device, the configuration of which is shown in detail in FIG. 1B. Number 109 designates a reader for entering new data when the file is first set up, when it is completely revised or when minor changes are made. Number 110 designates a buffer for zone connecting in order to handle communication between different service zones (i.e., for toll number information service). Number 111 designates a buffering device which functions as a multiplexer, gathers or distributes information from or to all input or output devices associated with each information operator. Number 112 designates a storage device which stores inquiry information for which relevant answers cannot be retrieved, for later statistical analysis. s/w designates switching equipment which exchanges regular devices with standby devices.

Referring to FIG. 1A, auxiliary input device 106 is used by each information operator to receive requests from subscribers, including the name of the desired subscribers, sometimes together with residence information thereof. If the inquiry information is insufficient, the information operator asks for it. Auxiliary input 106 gathers the information in place of the information operator. For example, the message generated by auxiliary input device 106 may be "Please tell us the name, the residence location and the occupation of the subscriber you want." This message is recorded in message device 1061. Message device 1061 is connected, in response to a connection signal, to the requester's line through the conventional telephony switching equipment, and transmits this message to the requester through hybrid coil 1062.

In conventional electronic communication systems, where the network impedance NW is equal to the line impedance, the transmission loss is large (almost infinite) between the message device 1061 and the recorder device 1063. Under these circumstances, any output from message device 1061 is transmitted to the line rather than recorded by recording device 1063. When the requester answers with the name, residence location and occupation of the desired subscriber, his answer is transmitted to recorder 1063 and message device 1061 through hybrid coil 1062. The answer is recorded in recorder device 1063, which transmits the answer to the operator's desk. When the operator addresses the output of recording device 1063, the recorded contents are reproduced for use by the operator.

Referring to FIG. 1B, output device 108, provided for output auxiliary processes, includes a controller 081, an automatic voice editor 1082 and a storage voice unit 1083. Central processor 103 generates a response including an operator identification symbol. This symbol actuates controller 1081 causing a connector switch to locate a corresponding desk 101. Autoditor 1082 generates speech from storage unit 1083. Storage unit 1083 stores spoken words, such as "won phonetic sound)" corresponding to numeral 1 (01 in inary code), $tu$ corresponding to the numeral 2 (10 in binary code), and so on. Editor 1082 scans and addresses appropriate words stored therein.

Auto-editor 1082 receives signals and generates in response thereto the same number pronunciation as the encoded numeral, and, in additon, generates speech such as "The number is" (this part is pre-recorded) 321-6291" (this part is newly edited from binary codes).

In accordance with the invention, the inquiry information is converted by conversion components in central processor 103, the the inquiry information is composed of generic codes or concepts of each item. The inquiry index, formed from the inquiry information, is to be compared with key-words that are prepared in the same way as the inquiry index from the data entries in the memory 104. The inquiry index has a form NAO (name, address, occupation) for each telephone subscriber.

Before proceeding with a description of the system of the present invention, it is helpful to briefly discuss the preferred embodiment of the signal format used in conjunction with the system.

Referring to FIG. 2A, the signal used in the system is comprised of digital encoded data. At each occurrence of clock pulses generated by a system clock, one 8 bit character is recorded in bit parallel. Each word W comprises a plurality of characters $D_1 \ldots D_n$. Each block of data comprises a plurality of words $W_1 \ldots W_n$. Furthermore, each block contains one particular word $W_s$ at the first position of the block. $W_s$ is called the starting word to indicate the break of each block. Another particular word $W_e$ is located at last position of a group of blocks, and is called the ending word.

As shown in FIG. 2B, each word comprises the proper number of digits $D_b$, $D_1$, $D_2 \ldots D_m$, and has a so-called break-digit $D_b$ at the start of each word to indicate word breaks. A particular word $W_s$ comprises one break-digit $D_b$ and three special digits $D_s$. Another particular word $W_e$ comprises three break-digits $D_b$ and one special digit $D_s$, as shown in FIG. 2C. Accordingly, it is possible to count the number of data by counting the number of words $W_s$, or it is possible to count the number of words by counting the number of digits $D_b$.

As shown in FIG. 2D, the inquiry information is organized into a block, which consists respectively of one starting word $W_s$, inquiry index $I_q$, another starting word $W_s$, the corresponding operator's desk number and a question number. The block of inquiry information is also called a "set of inquiry" and it precedes one information group during information retrieval. Therefore, it can be called a starting block. Thus, one information group comprises a "set of inquiry" and an end block whenever inquiry information flows into the system for processing. The information group comprises a starting block at the outset, and a data block $B_1 \ldots B_f$ along with an end block in the information retrieved from the system. The data block comprises $W_s$, $I_m$ (data entry with respect to main index), data (of subscriber) respectively. The end block comprises $W_s$ and $W_e$.

Although the description of this invention covers only a telephone number information service, it is to be understood that the invention can also be used for more general real time information retrieval based on ambiguous inquiry data.

As regards the process of entering new data into the file memory, details are discussed infra. However, for the purpose of supporting the discussion of information retrieval which follows, a brief explanation of the data entering process is now set forth.

The data, having the format of the data block shown in FIG. 2D, are stored in file memory 104 by a file clerk or programmer. The file clerk or programmer prepares the information to be stored in the main index for each datum of each subscriber to be registered. The data of each subscriber are punched onto tape or cards. The cards are set into reader 109 shown in FIGS. 1 and 3B. The data are then converted into the main index format by unit 320 shown in FIG. 3B. The main index and other data of each subscriber flow to file memory 104 shown in FIG. 3A. Counter device 218 counts the number of data flowing from device 320 to file memory 104. Each time the data count reaches 85% of capacity of one column or track of the file memory, counter device 218 generates a signal to the control unit (FIG. 3A) of file memory 104. The control unit in response to the signal generated by counter device 218 changes the recording track of file memory 104 to the next track. The remaining area of the track (15%) is left as temporary recording space for additional subscribers. Each time there is a track change, the corresponding main index datum (datum which is located at one end of the track) is transmitted to random access memory 201 (FIG. 3A) and is stored as a key-word. All data entries are recorded in file memory 104. Data in each track or column of file memory 104 are thereafter read out into device 320 (FIG. 3B) for calculation of a level or row number. The level number of each datum is determined by picking up partial items of the main index with regard to each data entry (multiplication of the partial items is discussed infra). The level number is then transferred to the file memory controller (FIG. 3A) together with each data entry which is, in turn, directed for storage in the level number area of the corresponding track of file memory 104.

Therefore, it is apparent that all data entries are stored in file memory 104. In practice, the operator receives a request for telephone number information service. For example, in the case of "Alexander Chemical Industry, Inc.", 14 Lexington Avenue, postal zone 16, New York, indexing is as follows:

| Alexander | $N_1$ | | |
|---|---|---|---|
| Chemical | $N_2$ | | |
| 16 | $A_1$ | | |
| Lexington | $A_2$ | | |
| Chemical Industry | Occupation | $O_1$ | k |
| | | $O_2$ | l |

As regards the occupation data $k$ and $l$, shown above, a sample table for encoding occupations is shown in Appendix 2 at the end of the specification. As seen in Appendix 2, the generic code covering the chemical industry is $k$, while the more specific code is the numeral 1. The inquiry information is inputted to the system as Alexander # Chemical # 16 * Lexington # Chemical Industry. In the system of the present invention, for convenience, the inquiry information is truncated and converted into a predetermined length and format, such as ALEXA # CHEMI # 016 * LEXIN # $k\, l$, before a searching operation for a telephone number corresponding to this identified subscriber is initiated.

The index for each entry datum is termed "main index $I_m$". The index determined from the inquiry information is called "inquiry index $I_q$". Some of the main indices of all subscribers, which are used for a comparing operation with $I_q$ are chosen for storage in the random access memory and are called "key-word KW".

As another convenience, the desk number, question number, and a format symbol I or II are added to $I_q$. The desk number and question number are automatically transmitted by key-board 102 (FIG. 1) just after the operator pushes the "request" key. Key-board 102 comprises a counter for the number of requests made, and a hard wire memory (not shown) containing the desk identifying number. Key-board 102 is conventional; accordingly, a detailed description thereof is omitted.

Format symbol I or II permits the operator to select one of two searching modes of file memory 104. I indicates that file memory 104 is to be searched. It is recalled that file memory 104 contains data stored in the order NAO. On the other hand, II indicates that a search is to be made of file memory 104' which, as aforementioned, contains data stored in the order NOA.

As still another convenience, parenthesis symbols ( and ) are used by the operator when it is unclear which part of a multi-part name should be selected as the most significant part $N_1$. For example, when the inquirer offers "Miami Hilton Hotel" it is unclear whether the inquirer means "Hilton Hotel" in Miami or "Miami Hotel" owned by Hilton. The operator avoids having to make a decision by typing the input data as "N(N')AO". In practice, however, the operator types the inquiry as $N_1(N_1')$ # $N_2$ # $A_1$*$A_2$ # O # I(or II). In addition to this data, the desk and question number are also transmitted following the inquiry information above. The desk and question number are automatically generated by the operator's desk equipment.

It should be noted that it is often unnecessary to use the parenthesis symbol because the most significant part of a name is generally known. The uncertainties in deciding which part of a name is most significant are minimized by using "the rule of $N_1$" shown in Appendix 1 at the end of the specification. However, where uncertainties do arise, the parenthesis symbol is available to the operator.

Figure 3B:
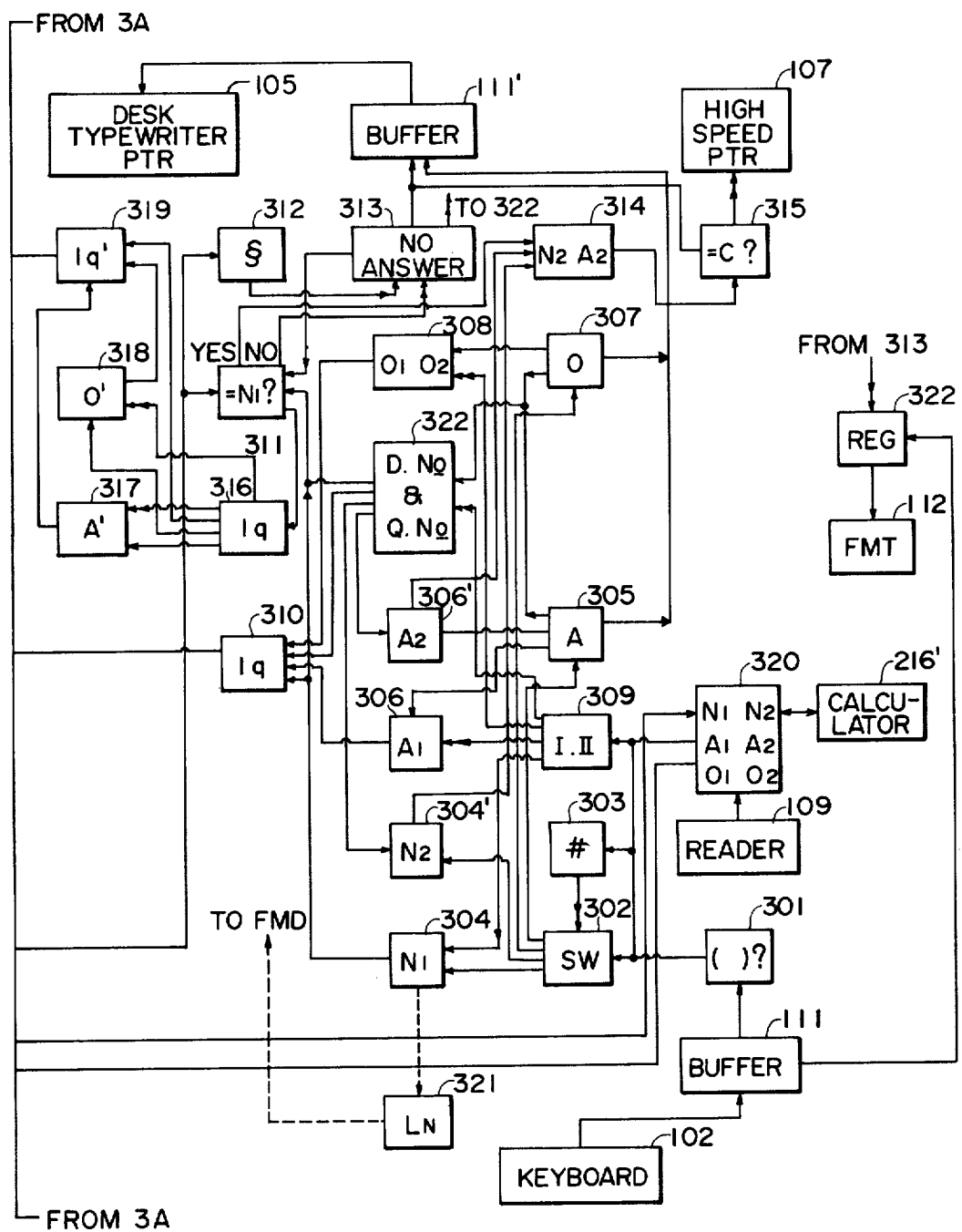

Description of symbol recognition circuitry associated with the central processor of FIGS. 3A and 3B are described immediately below.

SYMBOL RECOGNITION CIRCUITRY (FIG. 4A)

Figures 4A, 4B:
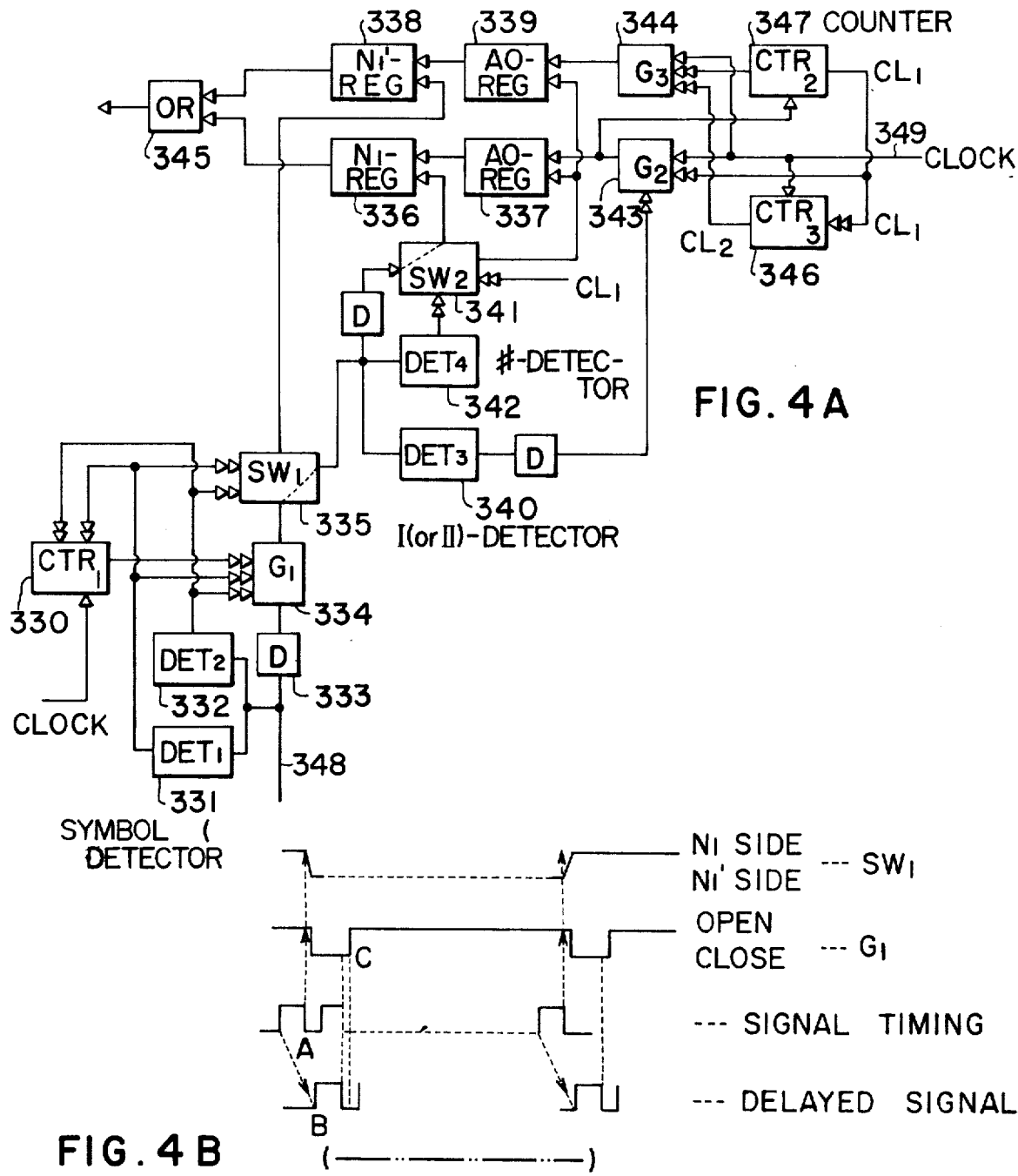
FIG. 4A is a diagram of the input divider, shown in FIG. 3B.
FIG. 4B is a timing diagram for opening and closing the input divider of FIG. 4A.

Referring to FIG. 4A, inquiry information having the format N(N')AO is generated to the symbol recognition circuit (shown generally in FIG. 4A) from buffer 111 (FIG. 3B) along line 348. Detector 331 responds to the open parenthesis symbol ( and transmits a recognition signal to gate 334, along with switch 335 and counter 330.

The normal path through switch 335 is from gate 334 to switch 341, as shown in FIG. 4A. The item $N_1$ contained in the inquiry index flows through switch 341 into register 336. Shortly thereafter, in response to the output of detector 331, switch 335 changes the route to register 338.

The open parenthesis signal is deleted by the inhibition of gate 334 which closes while the open parenthesis signal occurs. Soon thereafter, $N_1'$ is storred in register 336 and detector 332 switches switch 335 back into the normal path, as described above. Simultaneously, gate 334 is closed by the occurrence of the closed parenthesis ) signal.

Counter 330 begins to count the clock or timing pulses at the time of recognition of the parenthesis signals. After a predetermined number of clock pulses have been generated, the output of counter 330 opens gate 334. Delay circuit 333 functions to delay the information signal during the switching transient of switch 335 to prevent erroneous signal overlap, as shown in FIG. 4B.

Detector 342 responds to the symbol # , which is used to separate each element of the items forming the index. Detector 343 controls switch 341 in response to the number sign mark. After changing the state of switch 341 in response to the number sign mark, AO and the information following AO are stored in registers 337 and 339. Both registers 337 and 339 store the end of the inquiry information, that is, desk number and question number.

Memory cells for the desk number and question number are contained respectively in registers 337 and 339, and the cells include one-bit redundant cells. Since the inquiry index is formed in the format of $N_1(N_1')N_2A_1$-$*A_2O_1O_2$I(or II)$n_d$(Desk number)$n_q$(question number), the first symbol # is detected by detector 342 to change the circuit path from register 336 to registers 337 and 339. Switch 341 does not return to its original state after it is switched by the first symbol #, despite the fact that detector 342 identifies the second symbol #, until switch 341 receives a clear signal from control counter 347.

Detector 340 responds to the symbol I (or II) to actuate gate 343, which usually closes in response to clock pulses on line 349. After detector 340 detects format symbol I (or II), clock pulses output the contents of AO register 337. These read-out pulses are counted by counter 347. When the pulse count reaches a predetermined number, counter 347 transmits a read-out signal to gate 344 to cause gate 344 to pass clock pulses to line 349. Counter 347 also transmits a clear pulse $CL_1$ to counter 346, switch 341 and registers 336 and 337.

Counter 346 starts to count clock pulses at the time it receives clear pulse $CL_1$. When register 339 receives a read-out signal from counter 347, the redundant cell of register 339 goes to a logic 1. The corresponding cell of register 337 retains the state logic zero. Accordingly, if a question number is, e.g., 101 in binary code, the read-out signal is 1011 in register 339 and 1010 in register 337.

Clear pulse $CL_1$ closes gate 333 and changes switch $SW_2$ 341 to its original state. After counter 346 reaches a predetermined count value, it transmits a stop signal $CL_2$ to gate 344 to block clock pulses. Clear pulse $CL_2$ clears both register 338 and register 339, and $I_q$ is split into two parts NAO and N'AO.

Circuit 305 (FIG. 3B) receives address data in uncoded form, and contains a conversion table to convert a street address, postal zone, or ward designation into a numerical address code $A_1$ for subsequent processing. This processing is done with occupation items by incorporating an occupation table into converter 307.

ADDRESS CONVERTER 305 AND OCCUPATION CONVERTER 307

Figure 5:
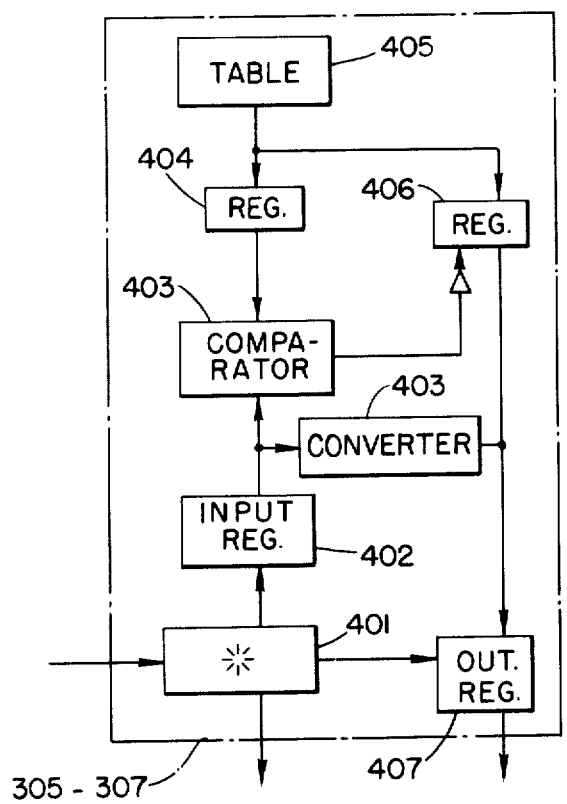
FIG. 5 is a block diagram showing one embodiment of a conversion component in the central processor shown in FIG. 3B.
Figure 6:
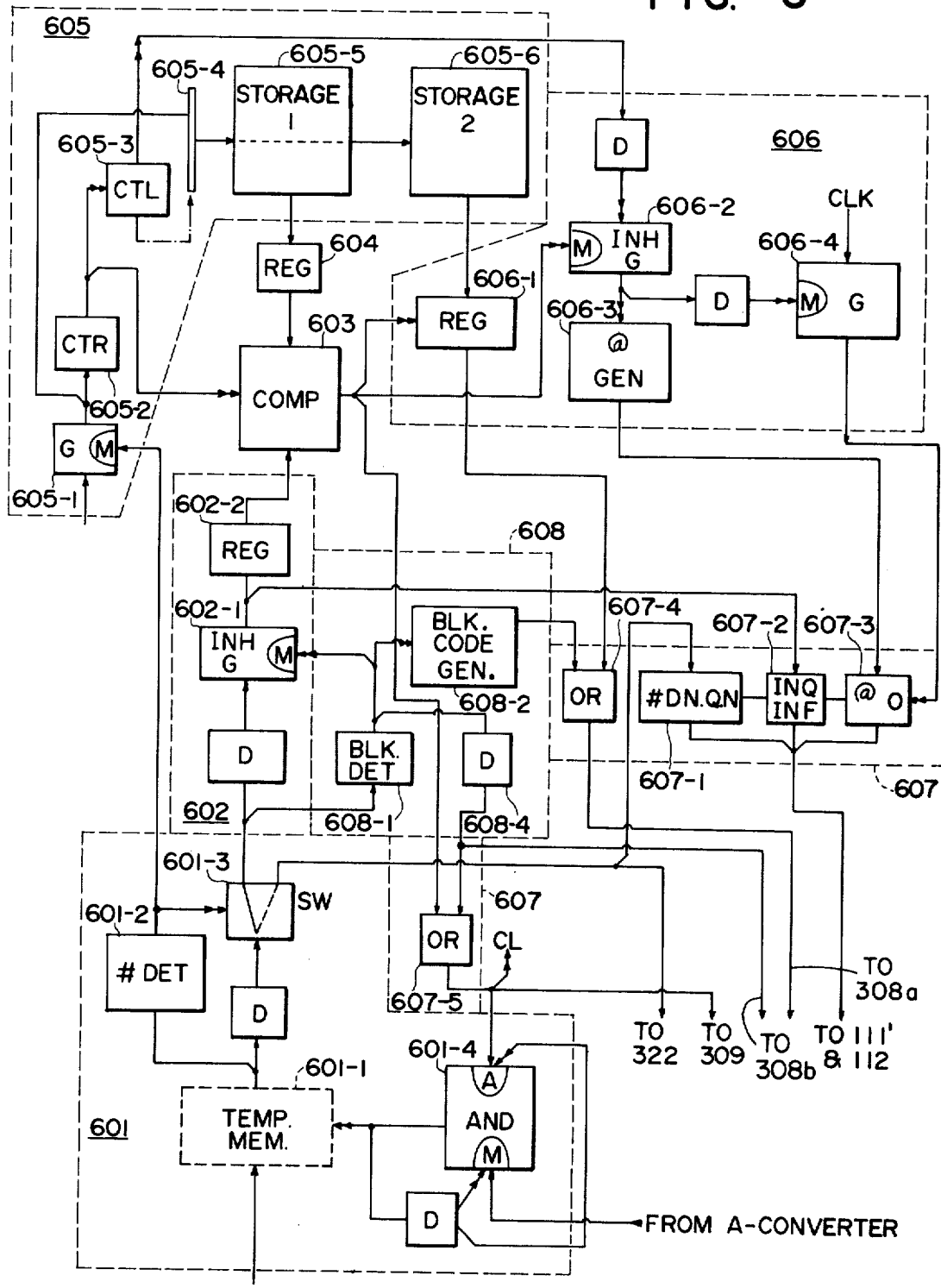
FIG. 6 is a logic block diagram showing details of the conversion components of FIG. 5 for occupation conversion in the central processor shown in FIG. 3B.

Referring to FIGS. 5 and 6, raw information such as $A_1A_2$ which can be, in some cases, a proper noun, or in other cases, a mnemonic symbol, is supplied to a decoding circuit 401 which relays the raw information to an input register 402. Then, a storage table 405 which has area designations $A_1$ (in the case of address register 305) or occupation titles $O_1O_2$ (in the case of occupation converter 307) stored therein, paired with numerical codes to represent each of those areas or occupations, serially supplies its contents to registers 404 and 406. Each trial data entry $A_1$ or $O_1O_2$ from storage table 405 is supplied to a trial register 404. At the same time, the corresponding code representing such area or occupation is supplied to a conversion register 406. Comparator 403 compares the contents of successive trial designations in register 404 with the inquiry designation in register 406. When comparator 403 detects coincidents, it generates a gating pulse to register 406 causing the contents of register 406 to be transmitted to an output register 407.

In certain situations, the information operator is uncertain as to how best to classify a particular occupation according to the classification provided by the table shown in Appendix II at the end of the specification. In other situations, the inquirer does not know the desired subscriber's occupation. In such a case, the operator enters blank code — into the occupation item position of $I_q$, i.e., NA—. On the other hand, if the inquirer does not know, the desired subscriber's address, the operator enters the blank code into the address item position, i.e., NO—.

Referring to FIG. 5, converter 408 of address converter 305 or occupation converter 307 converts the blank code into a broad or "top of list" numerical code, a terminal numerical code and an identifying code , for example, as follows: 01  80. This operates as an instruction to the system to scan the range of inquiry indices $I_q$ from $N_1A_1$ 01 to $N_1A_1$80. The symbols 01 ** 80 are detected by detector 213.

As regards address information, after the $A_1$ designation or its corresponding blank entry has been transmitted, circuit 401 (FIG. 5) responds to division mark * and diverts $A_2$ directy to the $A_2$ register 306' (FIG. 3b). This assumes that $A_2$ does not require any conversion and can be handled in raw form.

It will be understood that the computer system of the present invention is capable of servicing a plurality of information operators simultaneously, and on a real time basis. This is one of the important advantages of the present invention, since it provides rapid telephone information service with minimum human effort. In this regard, to enable the computer to sort out one operator's information request from another's each operator desk 101 (FIG. 1) associates its request with its unique identification number. Register 401 stores this identifying number while passing on only the address or occupation information to register 402. Subsequently, when the proper code is received and read-out from register 406 to register 407, register 401 transmits the identification number to register 407. Therein, it is recombined with the address information in coded form as a result of the conversion process. The combined identification and address information is then transmitted by register 407 for further processing.

Occupation converter 307 is discussed in greater detail with reference to FIG. 6. Device 601 in FIG. 6 corresponds to device 401 in FIG. 5. At the input of the circuit shown in FIG. 6, a temporary memory 601-1 stores inquiry information. The stored inquiry information is subsequently read-out from memory 601-1 to register 602 through switch 601-3.

An occupation noun is transmitted to register device 602 (corresponding to register 402 in FIG. 5) and is stored in register 602-2. If the occupation noun is blank-coded, such as NA—, blank-code device 608 identifies the blank-code signal. The blank-code identification signal is then transmitted to inhibit gate 606-2 for storage therein. Inhibit gate 606-2 inhibits the occupation information from passing through the circuit of FIG. 6, while the memory of the circuit shown in FIG. 6 stores the blank-code signal. The inquiry occupation data is transmitted to be stored in output register 607 (corresponding to register 407 in FIG. 5).

The inquiry information is of the form "occupation noun I (or II) # Desk Number # Question Number" or "-(blank code) # Desk Number # Question Number". The first symbol is identified by detector 601-2 which changes the state of switch 601-3. After the state of switch 601-3 is changed, the data "I (or II) # Desk Number # Question Number" is generated to output register 607 to be stored therein.

The inquiry information signal is also generated to a pulse gate 605-1 in Section 605 (Section 605 corresponds to Section 405 in FIG. 5) and the identification signal is stored in the memory associated with gate 605-1. While 605-1 stores the information signal, it passes clock or timing pulses for read-out of storage or occupation generic codes. The clock or timing pulses are transmitted to counter 605-2 and to the storage units shown in Section 605 for read-out thereof. Counter 605-2 counts pulses and monitors timing. At the proper time, counter 605-2 transmits a signal to comparator 603, and another count signal to storage controller 605-3. Storage controller 605-3 controls read-out of the storage units in Section 605, and in particular, storage unit 605-5 outputs its contents to register 604 in response to controller 605-3. Simultaneously the generic code stored in stoage unit 605-6, corresponding to the occupation noun or more specific code stored in storage unit 605-5, is read-out into register 606-1 (the entire register portion 606 corresponds to register 406 in FIG. 5). The contents of registers 602 and 604 are compared in comparator 603, and a coincidence signal is transmitted to register 606-1 for the purpose of signal read-out, to inhibit gate 606-2 for storage therein, and to OR gate 607-5 for signaling the end of a comparison operation, or for signaling the end of conversion. The contents of register 606-1 are passed to register 308 through OR gate 607-4.

Inhibit gate 606-2 receives the signal from control unit 605-3 indicating that read-out of storage unit 605, containing storage circuit 605-5 and 605-6 has reached the final data. If coincidence between the contents of registers 602 and 603 has appeared, the signal outputted from control unit 605-3 is blocked by gate 606-2. If coincidence has not appeared until the last stage, the signal from control unit 605-3 passes through gate 606-2 and actuates the symbol @ - generator 606-3. Generator 606-3 transmits @ to output register 607. The output signal of gate 606-2 is delayed until the @ signal has been transmitted, and then opens gate 606-4 for passing pulses to register 607. The contents of individual register circuits 607-1, 607-2 and 607-3 are transmitted in order to the designated operator's desk, and then to the magnetic tape 112 shown in FIG. 1. Transmission of the @ signal indicates that a concrete occupation noun has not been located by storage device 605 and that it is necessary to use another noun for inquiry.

Detector 608-1 transmits the blank-code identification signal. Blank-code generator 608-2 generates an output signal such as 01 ** 80. The latter signal is sent to device 308a in FIG. 3B through OR gate 607-4 in device 607. The former signal is sent directly to device 308b, referring to FIG. 8A.

It should be mentioned that, as regards the searching method incorporated in the present inventon, serial table lookup is adopted as one embodiment therein, and divisional comparison is adopted as another embodiment. These methods of searching will be discussed in detail infra.

The output of blank signal detector 608-1 or of comparator 603 indicates the finish of operation, and is memorized by a memory unit contained in AND gate 601-4. Similarly, the finish output from a converter 305 (FIG. 34) is applied to gate 601-4. The earlier of the two signals waits for the later signal, and when the signals are both simultaneously applied to gate 601-4, the gate transmits the output of temporary memory 601-1. On the other hand, the finish signal through OR gate 607-5 clears all memories and registers in the occupation converter shown in FIG. 6.

As described, a psuedo-numerical, or more specifically, an alphabetical representation of name information $N_1$ is supplied to register 304, an alphabetical representation of name information $N_2$ is supplied to register 304', a numerical representation of an appropriate code corresponding to address information $A_1$ is supplied to register 306, an alphabetical representation of address information $A_2$ is supplied to register 306', and a numerical representation of an appropriate code corresponding to occupation information $O_1O_2$ is supplied to O-register 308.

INTERMEDIATE PROCESSING OF INQUIRY INFORMATION $I_q$

Referring to FIG. 3B, circuit 304, etc., truncate the redundant characters as they are inputted by the operator to the system of the present invention. Circuits for redundant character truncation are well-known in the art, and a specific circuit is not described in detail herein. However, each of the registers 304, 304', 306 and 306' contains a register for storing input characters, an inhibit gate placed ahead of the storage register, and which is normally open but is closed upon entry of a signal from a counter.

Referring still to FIG. 3B, the next step is to transfer the inquiry index $I_q = N_1A_1O_1O_2$ to register 310, except for reduction index information $N_2$ and $A_2$ which are directed toward comparator 314. $I_q$ index can be entered into register 310 in whatever order is appropriate to a particular information inquiry. For example, if the inquirer knows the name and address of the desired subscriber but is less confident of the occupation, the operator will end the inquiry information with an end mark such as I. The end mark I instructs the computer system, in accordance with the present invention, to arrange the inquiry information so that inquiry index $I_q$ is entered into register 310 in the order NAO. On the other hand, if the inquirer is more confident of the name and occupation of the desired subscriber then he is of the address, the operator employs a different end mark such as II at the end of the inquiry information indicating that inquiry index $I_q$ is to be supplied to register 310 in the order NOA. Controller 309 recognizes end marks I and II. Controller 309 samples the output of keyboard 102 (FIG. 1) and controls the order in which registers 304, 306 and 308 transmit the information N, A and O to register 310.

Further processing of the information will now be described based on an assumption that inquiry information $I_q$ is supplied to the system of the present invention in the order NAO. However, it will be understood that operation is similar for inquiry information having an order NOA or an order $O_1O_2A_1$, for example, except that a different section of magnetic drum memory 104 (FIG. 1) is used.

The inquiry index $I_q = $ NAO in addition to the operator's desk identifying code is transmitted from register 310 to a register 273 (FIG. 3A). Register 273 stores the information $N_1A_1O_1O_2$ but removes the operator's desk identifying code and transmits said code to a register 214.

DEVICES 273, 309 AND 310

Figure 8A:
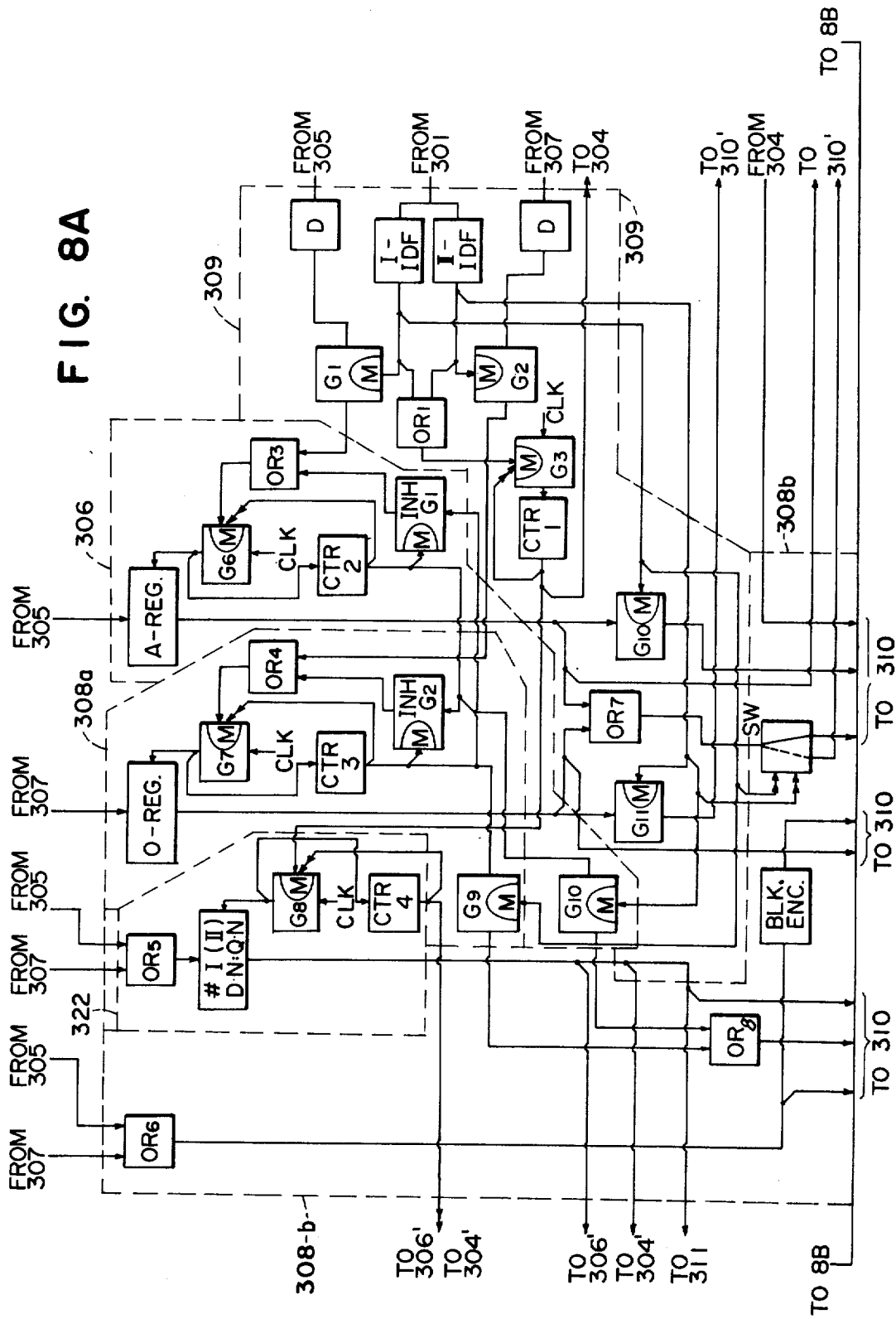

Referring to FIGS. 8A and 8B, and initially to FIG. 8A, circuit I-IDG and II-IDF in Section 209 are respectively identifiers of end marks I and II. Either of the two circuits transmits a starting signal to register 306 or 308 through gate $G_1$ or $G_2$. For example, in the case of an end mark I, circuits $CTR_2$, $OR_3$ and $G_6$ in Section 206 are provided for transmitting the contents of the A-register (address code) to register 310 to initiate O-register 308. Inhibit gate $INH.G_1$ in Section 308 maintains the proper order of operation of registers 306 and 308. Switch SW of register 310, operated by the output of the O-register in Section 308 and the A-register in Section 306 is switched to register 310' similar to register 310 in FIG. 8B.

Still considering end mark I, the information AO flows into $REG_3$ of register 310 (FIG. 8B) while registers $REG_1$ and $REG_1$, store the information $N_1$ generate by register 304. Circuit $CTR.DEV_1$ in register 310 (FIG. 8B) is a counter circuit provided for transmission of the contents of $REG_1$ and $REG_2$, respectively, to device 273 (FIG. 3A or 8B) and into comparator 272 (FIG. 8A).

Read-out of register $REG_1$ begins in response to the signal from gate $OR_8$ in register device 310 (FIG. 8A) indicating that transmission of AO information is completed. A predetermined number of bits contained in $N_1$ is counted by $CTR_1$ which transmits the count signal to gate $G_2$ in circuit $CTR.DEV_1$. After the contents of $REG_1$ are transmitted to comparator 272, the contents of $REG_2$ are then transmitted. The latter is also transmitted to the a-converter of device 273 (FIG. 8B) through switch $SW_3$. In the a-converter, the AO-code is converted into a numerical value for multiplication in calculator 216 (FIG. 3A).

When a blank-code — of $I_q$ is identified in converter 305 or 307, gate $OR_6$ of register 310 in FIG. 8A receives the identified signal. This signal actuates the blank-code encoder (see register 310 of FIG. 8A) to generate a — symbol and register said symbol in register $REG_4$ in register device 310 (FIG. 8B). Counter $CTR.DEV_2$ in register device 310 of FIG. 8B is actuated by a signal from gate $OR_8$, and transmits the contents of registers $REG_1$, $REG_3$ and $REG_4$, respectively, to device 214 in the form NA—.

As aforementioned with respect to FIG. 6, when a blank-code is present in inquiry index $I_q$, the contents of register 308 (FIG. 8B) has a format such as 01 *̄ 80. This informtion 01 *̄ 80 is transmitted to device 273. The symbol * is identified by circuit 213 in FIG. 3A or B, and said symbol controls switch $SW_1$ in device 273 (FIG. 8B). For example, the portion 01 is directed toward upper value register UPP.REG, and thereafter the *̄ - identifier switches the signal path to lower value register LOW.REG in devide 273 (FIG. 8B). Counter device $CTR.DEV_3$ transmits read-out signals to said lower and upper registers when the counter device has counted a predetermined number after receiving a signal from gate $G_9$ or $G_{10}$ in FIG. 8A. The A-code has been registered before that counting step. A01 and 80 respectively are directed through different routes different a-converters. Incidentally, switch $SW_2$ in FIG. 8B corresponds to element 215 in FIG. 3A.

DIVISIONAL SEARCH METHOD

In order to permit rapid determination of which drum memory track holds the desired information, keywords representing all the drum memory tracks are examined in order of what will be termed "fractional points". For example, in a group of key tracks, the keyword for track number T/2 is the ½ point keyword of that group. Similarly, the T/4 keyword represents the ¼ points, the T/8 and 3T/8 keywords represent respectively the ⅛ and ⅜ division points of the group, and so on.

The division point search system, involving successive division by two of the key tracks, i.e., T/2, T/4, T/8, etc., comes out even only if T is an integer power of two, i.e., $T = 2^m$, where $m$ is an integer. Accordingly, the total number of drum memory tracks is broken down into a largest integer power of two plus a remainder. For example, in a typical drum memory containing 1200 tracks, the largest power of two contained in the number 1200 is $2^m = 2^{10} = 1024$. The first 1024 memory track therefore constitutes the first remainder group. The first group step of a search is to compare the inquiry index $I_q$ representing the desired subscriber to the last keyboard K of the first division point search group, i.e., the keyword K of the 1024th memory track. If the inquiry code $I_q$ is less than or equal to the 1024th track code K, then it is known that the desired subscriber is included in the first division point search group, i.e., the first 1024 tracks.

On the other hand, if the inquiry index $I_q$ proves to have a greater numerical value than the keyword K for the track number 1024, it is known that the desired track falls into the remainder group, i.e., the last 176 tracks out of the total of 1200 tracks. To determine which of these 176 tracks is the correct track, one can take a division point approach to the 176 tracks. Specifically, the remaining 176 tracks can be divided into a division point group and a second order remainder group. Then, the search proceeds in the same manner using a division point analysis of this group. Ultimately, one will arrive at a last order remainder group which is too small to justify a further division point analysis, and the keywords K of this last order remainder group are simply serially scanned for a comparison with $I_q$. In practice, however, the first order remainder group of 176 tracks is not considered to be a large enough block of memory to justify a division point approach.

TWO-DIMENSIONAL DIVISION POINT SEARCHING

All track keywords K are stored in the random access core memory of the computer to facilitate rapid comparison with inquiry index $I_q$. However, in order to locate any desired keyword K as rapidly as possible in the core memory, the step of determining the core address of any keyword K involved in the division point analysis is avoided by using the core address in the divisional procedure directly as an $x,y$ coordinate core address. According to the procedure, each division point keyword K takes the form $_xK_y$. K represents any keyword in general, while the letter $x$ represents the $x$ memory coordinates as well as the division by two operation number. The letter $y$ represents the $y$ memory coordinate as well as the division by two operation number within a given division stage. For example, with reference to a second stage of division, wherein $x = 2$, dividing the group into quarters, the first division point $y = 1$ separates the first quarter of the group from the second quarter, while the second division point $y = 2$ separates the third quarter from the fourth quarter. This processing is summarized by the following diagram, which generates a general method of developing division points keywords of the form $_xK_y$:

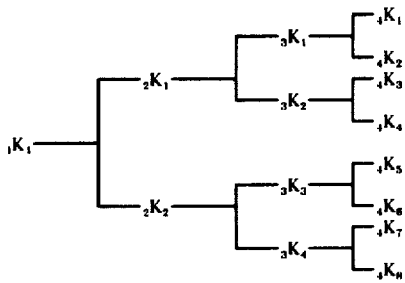

As the above diagram illustrates at the first division level, $_rK_y$ is $_1K_1$. At the second level, there are two division points $_2K_1$ and $_2K_2$, and so on through succeeding levels of division. Note that $_1K_1$ is the ½ division poing, $_2K_1$ is the ¼ division point, and so on. This can be better envisioned by considering the chart set forth above as being a drum memory which has been flattened out into a plane. Tracks of the memory extend from the top of the chart to the bottom with the track represented by $_1K_1$ being in the middle of the drum. This is what is meant by the ½ division point. Also note that $_2K_1$ is the ¼ division point (it corresponds to a track between the top of the drum and the middle thereof) while $_2K_2$ is the ¾ division point. In general, division point $n/t = (2y-1)/2^x$, where $n$ is a particular track number having a keyword $_rK_y$ and $t$ is the total number of tracks in the division point group.

It should be mentioned that if the address number of core memory 201 is serial, the consecutive number of the core address can more simply be obtained by the formula:

$$z = 2^{r-1} + y - 1$$

Since $$2z = 2^{(r+1)-1} + (2y-1) - 1$$

and $$2z+1 = 2^{(r+1)-1} + (2y) - 1$$

If the value of $m$ or number of keywords is too large to store keywords in the prescribed volume of memory 201, all keywords are divided into many groups based on the initial letters of $N_1$.

INITIAL LETTER IDENTIFIER 321

Figure 7:
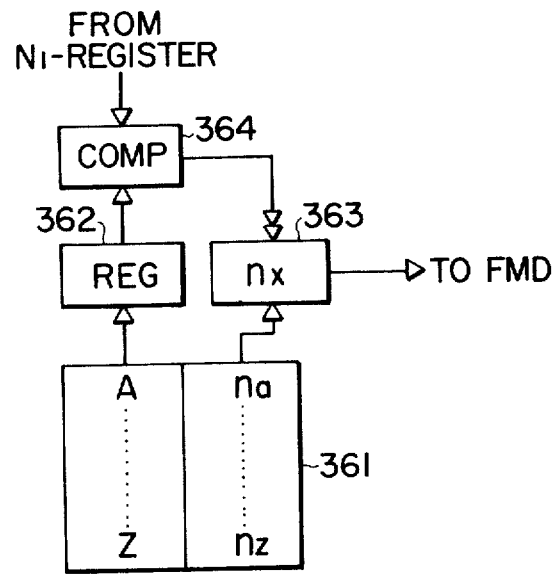
FIG. 7 is a block diagram of an initial letter identifier of the central processor shown in FIG. 3B.

Referring to FIG. 3A, initial letter identifier 321 monitors the initial letter of $N_1$ in register 304 and defines the corresponding group. The output of identifier 321 instructs an external memory FMD (fast magnetic drum) to read-out a defined group having the corresponding keyword. Referring to FIG. 7, showing details of identifier 321, memory 361 is a table containing alphabetical letters $a$–$z$ accomplished by the location number $n_a$ to $n_z$ in FMD. The location numbers $n_a$ to $n_d$ correspond respectively to the alphabet letters $a$–$z$. When the signal that, e.g., the inquiry information $N_1$ has been stored in register 304, or switch 302 has changed the signal path from register 304 to register 304', reaches initial letter identifier 321, read-out of table 361 to register 362 or register 363 is initiated. Register 362 restores the letter $a$–$z$ as a tag, and register 363 stores the FMD area number. If comparator 364 finds a match between the contents of register 362 and the initial letter of $N_1$ register 304, the coincidence signal actuates register 363. The output of register 363 is supplied to an FMD control circuit (not shown). The group of key-words, transmitted from memory FMD, is directed to core memory 201 (FIG. 3A) while the raw inquiry $I_q$ is formed into an encoded $I_q$ in $N_1$ register 304 through $I_q$ circuit 310 (discussed supra), and together with the group, a particular $m$ for the group is transmitted from memory FMD to circuit 209 (FIG. 3A).

Inquiry index $I_q = $ NAO is transmitted to comparator 272 (FIG. 3A) which conducts successive stages of comparison to find the corresponding key-word $_rK_y$ which identifies the desired memory track $n$. Initially, $x$ register 222 and $y$ register 220 are cleared so that their contents are at logic 1. The value logic 1 in $x$ register 222 causes $x$ address driver 203 to energize the line corresponding to the $x = 1$ coordinate in core memory 201. The value logic 1 in $y$ register 220 is outputted to calculate circuits 206 and 206', and in addition, cause $y$ address driver 202 to energize the line in core memory 201 corresponding to the coordinate $y = 1$. Coincidence of the $x$ and $y$ drive signals causes the contents of core member 201 at the address $x = 1$, $y = 1$, to be read out to register 208. The information received by register 208 comprises the word $_rK_y = _1K_1$, along with the number $n$ of the memory track comprising thereto. This information is then transmitted to register 271 which separates the $_rK_y$ component from the $n$ component. The $_rK_y$ component is supplied to comparator 272 for comparison with the $I_q$ information received from register 273.

When the results of the comparison in comparator 272 indicates that $I_q$ is less than key-word $_1K_1$ (the half point key-word), an output from comparator 272 causes calculator 276, which has performed the calculation $y = 2y-1$ just after it has received the $y$ value from register 220, to enter the content in register 220 as the new trial value of $y$.

On the other hand, if the comparison in comparator 272 indicates that $I_q$ exceeds $_rK_y$, an output from comparator 272 is transferred to calculator 206' (which has performed the calculation $y = 2y$ just after it received the $y$ value) and enters the content in register 220 as the new trial value $y$. After one of the calculators 206 or 206' has altered the content of $y$ register 220, that register feeds back the new value of $y$ to both calculators simultaneously when register 220 transmits the new value $y$ to register 202.

Incidentally, each time a comparison is made, regardless of whether $I_q$ or key-word $_rK_y$ is greater, an output from comparator 272 adds 1 to the value of $x$ in register 222, and also adds 1 to counter 209 (which started with an initial value of 0). Similarly, with each comparison, the new key-word $_rK_y$, along with the new track number $n$, are read out of core memory 201 to registers 208 and 271, and the new value of $_rK_y$ is supplied to comparator 272 for further comparison with $I_q$.

As a third possibility, when comparator 272 detects equality between $I_q$ and one of the successive trial values of the key-word $_rK_y$, an output from comparator 272 activates gate 209'. One of the outputs from gate 209' then reads out the present track number $n$ from register 271 for use in instructing file memory 104 to output that track. Other outputs from gate 209' restore the $y$ register 220 and $x$ register 222 to their initial value of 1, clear counter 209 to its initial value logic 0, and clear comparator 272. Counter 209 keeps track of how many steps of comparison (how many stages x of division point analysis) have been performed by comparator 272. As previously stated, since x is the number of division by two steps, when $x = m$, the last possible stage of division point analysis has been reached, because the division point search group only encompasses the first $2^m$ tracks of the file memory. In the practical example given, $m = 10$ and $2^{10} = 1024$ tracks. Therefore, only $m = 10$ steps of division point comparison can be carried out by circuit 272.

Gate 209' generates a "readout" signal at the time when $I_q = {}_rK_y$ only when x is not equal to m. Even when x does equal m and $I_q = {}_rK_y$, since the signal from gate 209 is delayed by the output of comparator 272, the readout signal from gate 209' can be generated. After the signal representing $I_q$ equals ${}_rK_y$ appears at the output of comparator 272, the signal representing $x = m$ from gate 209 appears, and the signal $x = m$ is transmitted from gate 209' to clear or reset circuits 209, 220, and 222.

Summarizing the above, gate 209' generates a "readout" signal in response to signal $I_q = {}_rK_y$, even before the state $x = m$ is reached or circuit 209 does not reach this state. When there is no signal $I_q = {}_rK_y$, gate 209' generates a readout signal if circuit 209 generates the signal $x = m$. In both the situations above, when circuit 209 reaches the state $x = m$, gate 209 generates a "clear and restore" signal to circuits 209, 220, and 222.

If the $m = 10$ stage still does not produce an ${}_rK_y$ equal to $I_q$, division point searching is abandoned. When $x = m$ and $I_q$ still exceeds ${}_rK_y$, outputs from counter 209 and comparator 272 actuate AND gate 210 which causes circuits 211 to transmit a logic 1 signal to adder 212. Adder 212 performs an addition N + 1, signifying the next track number in file memory 104.

PRACTICAL CONSIDERATIONS IN DIVISION POINT SEARCHING

If $I_q$ is larger than K.W. (⅝), indicating the key-word corresponding to the ⅝ division point, we add the numeral 1 to the numeral 5 and arrive at K.W. (¾) which is the key-word of the former step. Thus, when the comparing step is completed in the state "$I_q$ is larger than the key-word," the numeric value n in x register 222 must be incremented by the numeral 1.

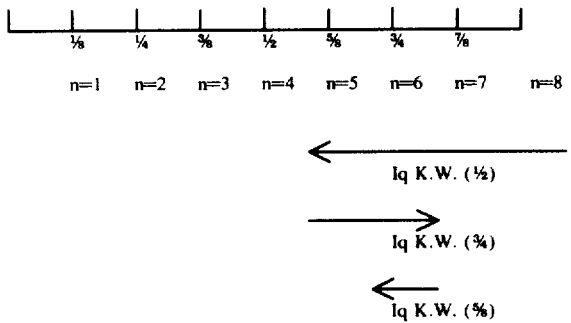

In case more than two columns of $I_q$ are identical, that is, the key-words are the same, the definition of the column number becomes confused or ambiguous. For example, in one case, the system may define the key-word as a second track or column, or in another case, the system may define it as the third column of the group of the same key-words. In fact, the computer must read out data from the first column to the last column of each group. Therefore, after the first step of data write-in, the key-words are read out from core memory 201 sequentially into a working memory (not shown) and the associated track number n is modified only for that group.

For example, suppose that $p, p+1, p+2, p+3, \ldots$ are, respectively, the column numbers of one "same key-word" group. Modification of track number n means that $p+1$ is reduced to $p$, $p+2$ along with the $p+3$ is reduced to $p$, and so on, in accordance with such modification whenever comparison is stopped with respect to one group, the read-out instruction always begins with the first column P. The shift from the p to the $p+1$ column is made by an overflow mark discussed infra with respect to level definition.

Each column has a different key-word from the last one of the previous column. However, the entries of the same index $I_q$ as that key-word can continue to the next column. Therefore, partial records in the next column out of that group overflowing from the previous column must also be read out by the overflow procedure.

LEVEL DEFINITION IN FILE MEMORY TRACKS

As previously indicated, read-out of all the levels in a track n in accordance with a division point group may be avoided by calculating the upper and lower limits of the range of levels of that track or group of tracks within which a desired subscriber is likely to be found. This calculation is carried out by calculator 216 (FIG. 3A) which receives AO information from register 273, after the information has been converted into its corresponding ordinal value a by means of a stored conversion table in register 273. The table operates on input information according to the formula $$a' = (A-1) \times 80 + 0 \text{ (if 0 is of 80 kinds)}$$

and $$a' = b \times s + a,$$

where
 $b =$ the number of blocks in one track
 $s =$ quotient
 $a =$ rest of division, smaller than $b$;
that is AO is now converted into a. One section of calculator 216 multiplies a by q, to determine the upper limit level number within track n. Another section of calculator 216 performs the calculation $(a-1) \times q + 1$ to determine the lower limit level number in the track. The information as to the range of track levels from calculator 216 is then read out to the control unit (FIG. 3A) of file memory 104.

In accordance with the process of random sampling subscribers contained in a common AO block, a particular constant q is determined. However, it should be pointed out, that if address computation is made only by division point comparison, the constant q is unnecessary. However, where level definition is utilized, q is computed as follows: the mean value of the number of subscriber values having a common AO plus standard deviation sigma. In practice, I have found that q is an integer of approximately 10. I computed this value according to the results of data sampling in an actual Tokyo telephone directory. This statistical computation assures that normally the number of subscriber entries to be assigned to consecutive track levels will not exceed the capacity of one track. For example, if the normal number of entries assigned to one block is $q$ = 10, the range will go above and below $q = 10$.

OPERATION OF LEVEL DEFINITION SYSTEM

Suppose, for example, A 01 = $a_1$, and A 80 = $a_2$, then decoding circuit 213 (FIG. 3A) recognizes the symbol **, and responds thereto by activating switch 215 so that alternative $a_1$ is read from register 273 to one channel of multiplier 216, and $a_2$ is switched to the remaining channel of multiplier circuit 216. Along one of the channels of circuit 216, the lower ordinal value $a_1$ is decremented by the numeral 1, multiplied by the value $q$, and the result is incremented by numeral 1 to establish a lower limit of the range for track reading. With respect to the other channel of circuit 216, the higher ordinal value $a_2$ is multiplied by the quantity $q$ to calculate the upper range limit (see calculator 216 in FIG. 3A). As aforementioned, the value of $q$ is approximately 10 in practice.

Upon receiving the track calculation from adder circuits 212 and the results of the level range calculation from calculator 216, the control unit of file memory 104 consults the designated portions of the memory. The desk code combiner 214 combines retrieved data with the desk number and question number and transmits the information to comparator 311 (FIG. 3B).

OVERFLOW RECOGNITION

Secondary identifier 217 (FIG. 3A) identifies overflow symbol % at the end of the system response to an inquiry, and causes the control unit of file memory 104 to read the entries starting from the overflow location indicated at the foregoing end of the entry-group together with the symbol %. The symbol % is available for identifier 217 to recognize the next read-out address which is transmitted to the control unit of file memory 104.

For the following discussion, a group of $q$ levels is now termed a "block". When entries occasionally exceed $q$ in number, the first $q$ entries are stored at the first $q$ levels of block $a$, for example, and the last level is used to store the mark % and level number $h$. This indicates an overflow instruction such as "Proceed to the next level $h$ which belongs to the block B". Then, at levels of block B, there are recorded symbols §, which means "this entry is an overflow." Each surplus entry will be stored at levels below level $h$ of block B. When necessary, particularly as the subscriber population shifts, an overflow may originate at the first empty level of a block which is less than fully occupied. In that case, an overflow mark ₴ at level $h$ and following level $h$ serve to separate the group of entries occupying levels 1 through $h - 1$ from the overflow of another track occupying levels $h + 1$ and the levels following $h + 1$. Each level of the overflow entries has the symbol ₴ recorded together with the entries. The symbol § designates that the entry has overflowed from another block, and it is identified by detector 312, whose purpose is to determine error information retrieval caused by a wrong inquiry index.

When a tertial identifier 312 (FIG. 3B) reads the symbol ₴ at the beginning of a read-out block in a track, indicating that what follows is an overflow, then there must be some error as regards part of $I_q$; otherwise, the calculations at first would have led to a nonoverflow entry of a head block of an $A_1O_1O_2$ group. Detector 312 monitors the response of circuit 214 and recognizes overflow mark when it occurs in the first entry of responses. Detector 312 then generates an output to "no answer" circuit 313. The output of detector 312 "primes", but does not trigger the circuit 313.

The block of entries is defined by calculator 216, that is, the entries are rearranged in a block in order of $a$ even if they are different as regards their $N_1$. Therefore, the responses from one block may contain entries of a different $N_1$ from that of a corresponding $I_q$.

Comparator 311 receives the $N_1$ code of the inquiry information directly from register 314, and compares it with the $N_1$ codes included in the system response information to determine whether there is a match. All information coming from file memory 104 which does not have an $N_1$ code matching the $N_1$ code stored in register 304 is eliminated from further consideration by the system. If all responses are eliminated by comparator 311, comparator 311 primes but does not trigger "no answer" circuit 313.

$N_1$ CHECKER CIRCUIT 311

Figure 9:
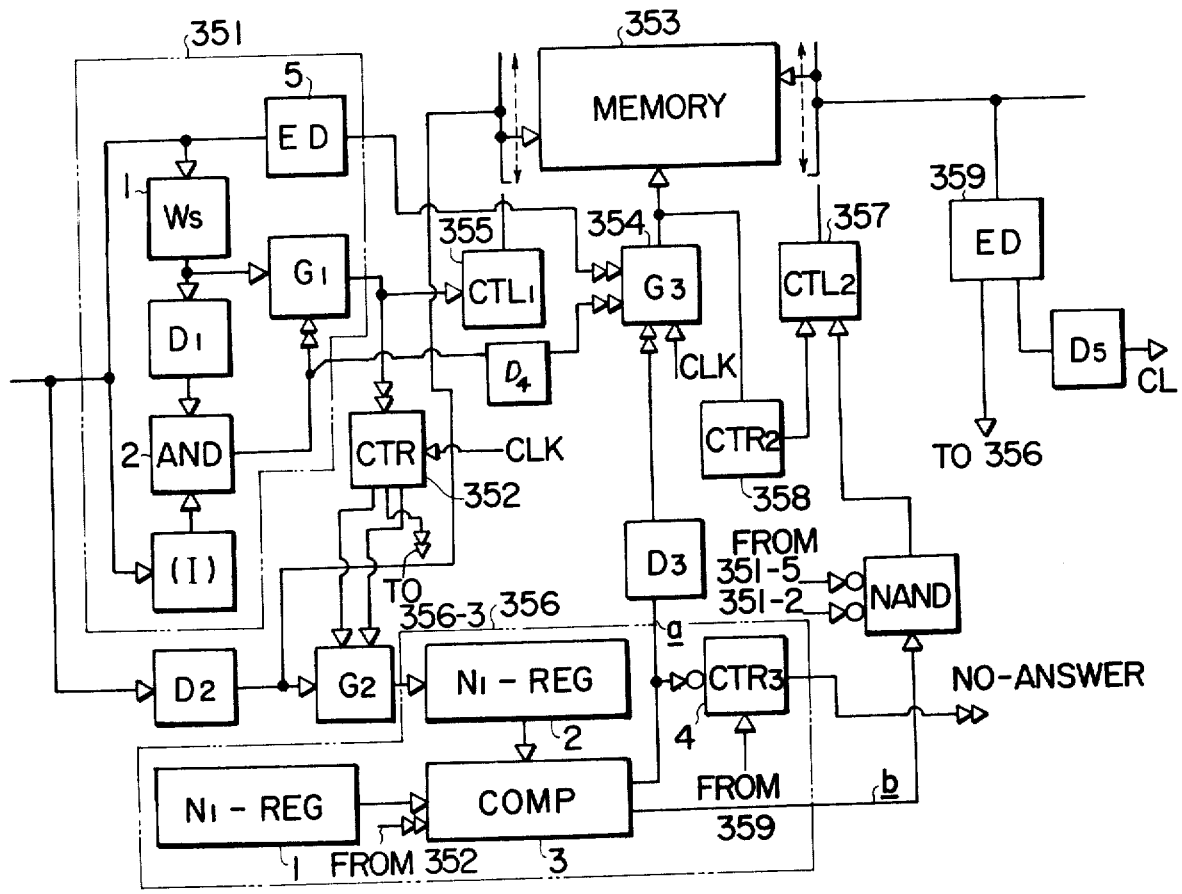
FIG. 9 is a block diagram showing a detail of the $N_1$ checker such as device 311 in FIG. 3B.

Referring to FIG. 9, details of $N_1$ checker 311 (which is similar to answer counter 314 in FIG. 3B) are described. At the input, a detector 351 is a selecting device with respect to $N_1$, an end mark (I or II) and a starting word ($W_s$). Counter 352 is initiated by a $W_s$ signal to count clock pulses, and transmit signals for timing the beginning and ending of $N_1$ while gate $G_2$ passes input information. Input information is also stored in memory 353.

The $N_1$ item in the input information is registered in $N_1$ response register 356-2. The $N_1$ item is compared with the $N_1$ inquiry stored in register 356-1. A coincidence signal on line $a$ from comparator 356-3 opens gate 354 to pass a read-out signal. A coincidence on line $b$ causes output controller 357 to skip by an amount of one data block. However, the signal on line $b$ is inhibited while the output of end detector 351-5 or symbol I or II detector 351-2 exist.

When end detector 359 identifies an end block in the output information, the detector transmits a clear or stop signal to return each element to its original starting state where the signal is delayed as long as counter 356-4 can operate. Counter 356-4 counts the number of coincidence pulses; if the count is 0, an output of end detector 259 reaches counter 356-4, and counter 356-4 transmits a "no answer" signal.

When primed by either circuit 311 or circuit 312, circuit 313 transmits a signal to the $N_1$ checker 311 which causes checker 311 to transmit the inquiry index $I_q$ to register 316 (FIG. 3B). The end mark I or II accompanies this information supplied to circuit 316, and serves to advise circuit 316 as to whether the search is being conducted in the order NAO or NOA. In response to the end mark symbol, circuit 316 then retransmits the information in the order indicated to the circuits following circuit 316.

First, N is transmitted directly to register 316 without change. Then, A and O are transmitted to error-A converter 317 and error-O converter 318 (FIG. 3B) respectively. The order of this transmission depends upon whether the search is being conducted in the NAO or NOA sequence, governed by end mark I or II. Circuit 317 alters A to form A', and circuit 318 alters O to form O'. A' and O' are trial corrections, which attempt to correct possible errors in information which the inquirer has presented in his request. The error correction processes discussed infra in connection with FIG. 12.

If some information generated by file memory 104 does match the original inquiry with respect to $N_1$, that information is transmitted to reduction comparator 314. Reduction comparator 314 receives the contents of $N_2$ register 304' and $A_2$ register 306', and checks to determine whether the $N_2$ and $A_2$ information included in the response information coincides with the $N_2$ and/or $A_2$ information of the original inquiry retained in these registers. Responses which do not coincide in this respect are eliminated in the conventional method.

Since the $N_2$ or $A_2$ (secondmost significant terms) of the inquiry data is incorrect a high percentage of the time, it may frequently occur that a wrong $N_2$ or $A_2$ in an inquiry is compared to a correct $N_2$ or $A_2$ in a registered entry of file memory 104. Even if the comparison in circuit 314 achieves no coincidence, there might be a correct response $N_2$ or $A_2$. Therefore, even if there is no coincidence, all responses from file memory 104 must not be abandoned; they must be retrieved as a system output. Only when there is a coincident entry, the remaining, non-coincident data are eliminated.

REDUCTION COMPARATOR 314

Figure 10A:
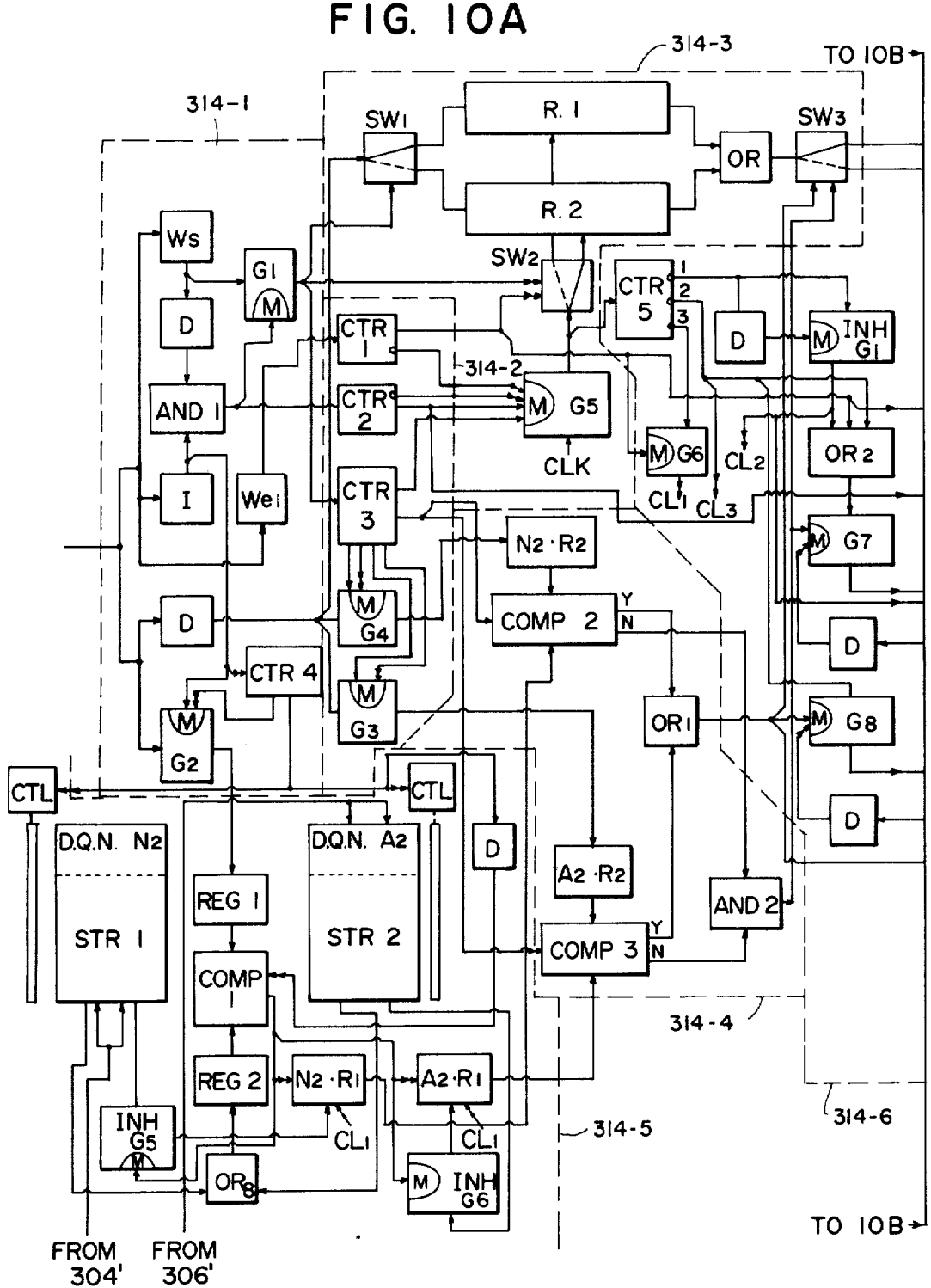
FIGS. 10A and 10B together are a diagram of the reduction components, such as device 314 in the central processor shown in FIG. 3B.
Figure 10B:
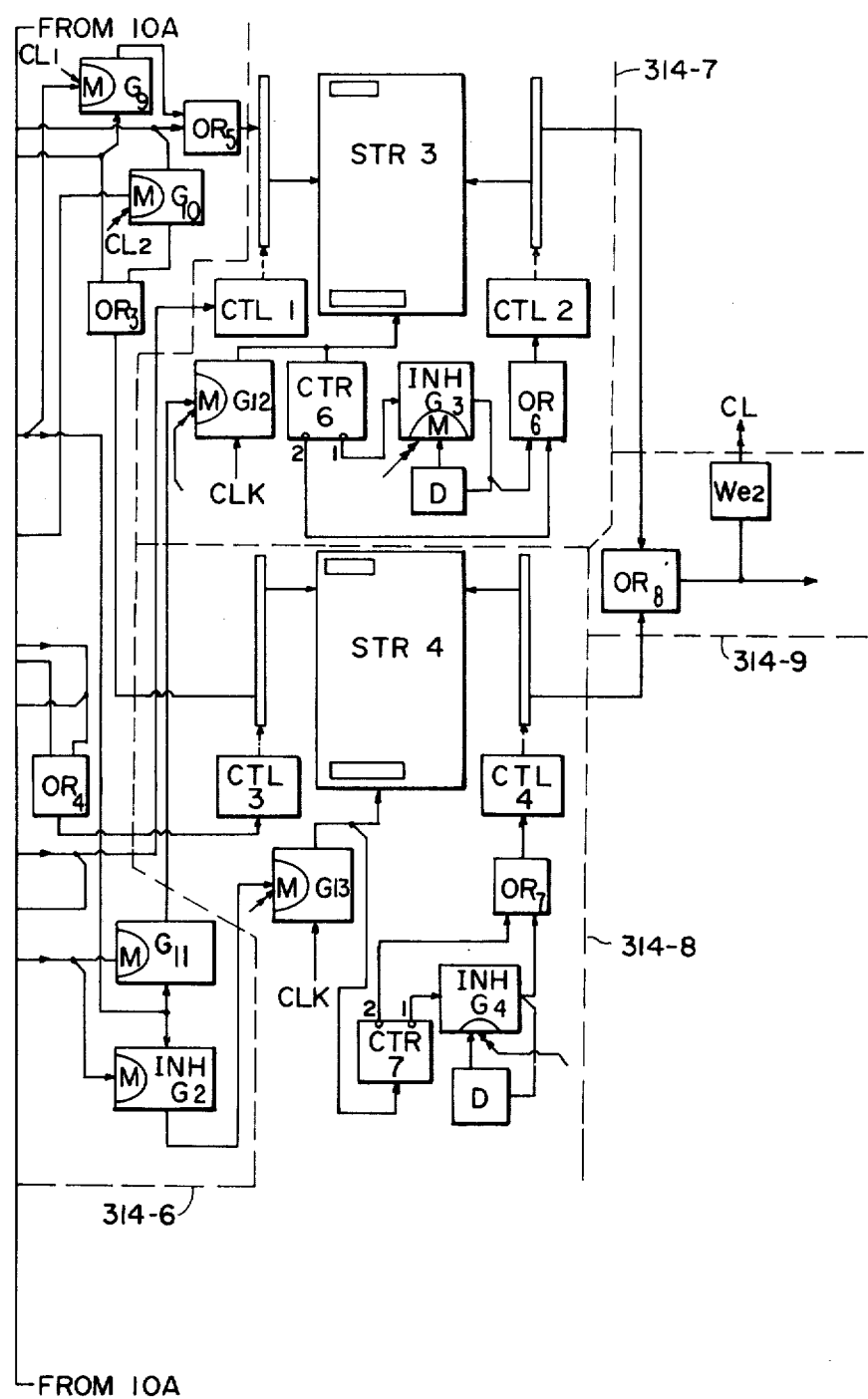

Referring to FIGS. 10A and 10B, the operation of reduction comparator 314 will now be explained in detail. FIG. 10A, Section 314-1 detects control sysmbols such as $W_n$, 1, and $W_e$, from the input data group, and in response thereto, actuates Section 314-2. Section 314-2 is a primary controlling device comprising three counters and two gates.

Section 314-3 is a registering circuit comprising two registers, and an OR gate, switches $SW_1$ and $SW_3$, and a read-out including $SW_2$. Section 314-3 delays the input data while $N_2$ and $A_2$, in the response from file memory 104, are compared with $N_2$ and $A_2$ in the inquiry index $I_q$. While the contents of $R_1$ (in Section 314-3) are read out through $SW_3$, $N_2$ and $A_2$ in the next response corresponding to the contents of $R_2$ are compared with $N_2$ and $A_2$ in the inquiry index through comparator 314-4.

Comparator 314-4 comprises a register for storing $N_2$ and another register for storing $A_2$ of the input data, along with two comparators, and OR gate and an AND gate. The OR gate is provided for producing an output in response to coincidence for control of $SW_3$. $SW_3$ in turn switches the output path to storage circuit 3 in Section 314-7 (FIG. 10B). The output of the AND gate, in response to no coincidence, switches the output path to storage unit 4 in Section 314-8 (FIG. 10B). The non coincidence data are stored in register 4.

Section 314-5 is provided to store $N_2$ and $A_2$ retrieved by means of the desk number and question number contained in $I_q$ and compared respectively in comparator 314-4. Section 314-6 is a secondary control device comprising five gates, two inhibit gates, four OR gates, for controlling output data from registering ection 314-3, so that the output data is stored in storage unit 3 or storage unit 4 depending respectively on coincidence or no coincidence with reference to the eduction index $N_2$ or $A_2$. This ensures that in both storage units, the starting block (see FIG. 2D) and the end block will not be dropped. If the output of OR gate $OR_1$ in the comparator 314-4 of FIG. 10A is transmitted immediately, it is stored in the memory portion of gate G11 in secondary control section 314-6, and is stored simultaneously in the memory portion of inhibit-gate $INH-G_2$ to block the circuit path.

At a predetermined count after recognition of an end-mark $W_e$ by identifier circuit $W_{el}$ in the identifying section 314-1, the output of counter $CTR_1$ in primary control section 314-2 is supplied to gate G11 in secondary control section 314-6. The output of gate G11 actuates gate G12 in storage section 314-7. Gate $G_{12}$ transmits the read-out pulses of storage unit 3. Storage section 314-7 stores coincidence data with respect to reduction index $N_2$ or $A_2$ in comparing Section 314-4, while non-coincidence data with respect to the reduction index are stored by storage section 314-8.

Where inhibit-gate $INH.G_2$ can pass a signal from counter $CTR_1$ in section 314-2 even during time recognition of end identifier $WE_1$ in section 314-1, gate $G_{13}$ in storage section 314-8 begins to transmit read-out pulses to storage unit 4.

ADDITIONAL REMARKS CONCERNING REDUCTION DATA $N_2$, $A_2$

According to empirical statistics, the percentage of times at which both $A_2$ and $N_2$ are incorrect is nearly 0. The percentage with regard to error in $A_2$, along with cases where $A_2$ is lacking is 32%, while the percentage of incorrect $N_2$ along with cases where $N_2$ is omitted is 15%. Since $A_2$ and $N_2$ are mutually independent concepts, the cases in which $A_2$ and $N_2$ are both invalid is $0.32 \times 0.15 = 0.05$, that is, either $A_2$ or $N_2$ is available 95% of the time ($1.00 - 0.05 = 0.95$). Accordingly, it is very rare that all responses from circuit 311 are transmitted to circuit 315 (FIG. 3B). As shown in the following empirical table, the number of requests retrieved by the same $N_1$ is distributed as in the left column. The mean value of this distribution is clearly about 300 to 400.

The resolution of $N_1$ is improved by means of the remaining input items $A_1$ or 0. The NA column or NO column, shown below, indicates the distribution of values 20 through 30.

When N, A and O cooperate, as shown in the right column of the table below, the average distribution value is 3.1. The number of request exceeding two entries of the same $I_q$ is $(95 - 56) = 41$, but this is reduced to 2 by circuit 314 in FIG. 3B, where 2 is calculated by ($41 \times 0.05 = 2$).

| Number of retrieved entries by the same item | $N_1$ | $N_1A_1$ | $N_1O1O_2$ | NAO |
|---|---|---|---|---|
| 1 | 3 | 20 | 19 | 56 |
| 2 | 6 | 6 | 14 | 14 |
| 3 | 1 | 7 | 6 | 5 |
| 4 |  | 7 | 2 | 9 |
| 5 | 1 |  | 7 | 3 |
| 6 |  | 5 | 4 | 2 |
| 7 | 2 | 4 | 4 | 2 |
| 8 | 1 | 2 | 1 |  |
| 9 – 10 | 2 | 2 | 7 | 2 |
| 11 – 20 | 5 | 14 | 13 | 3 |
| 21 – 40 | 10 | 14 | 12 | 2 |
| 41 – 80 | 12 | 6 | 2 |  |
| 81 – 160 | 12 | 7 | 4 |  |
| 161 – 320 | 12 | 2 | 2 |  |
| 321 – 640 | 15 | 1 | 1 |  |
| 641 – 2560 | 3 |  |  |  |
| 2561 above | 5 |  |  |  |
| Total | 97 | 97 | 97 | 97 |

It can be seen that with 97 trials, when NAO was entered, only one number was retrieved 56 times, while six numbers were retrieved only two times. The system never outputted greater than 40 numbers when NAO was supplied in the inquiry information.

Accordingly, the majority of responses from the system of the present invention are outputted as a single telephone number identifying the desired subscriber. This permits the automatic answering device, shown in FIG. 1B, to provide the answering function without any operator action. However, when there are more than two numbers outputted from the system, the operator must consult with the inquirer as to which among them is the desired number, that is, in practice, an operator must always be provided. As discussed above, the $N_2$ and $A_2$ inquiry information is used as a reduction index to reduce the number of answers outputted from the system, and helps reduce the work load of the information operator. The system response to an inquiry which passes all tests are transmitted to counter 315 (FIG. 3B).

ANSWER COUNTER 315

Figure 11:
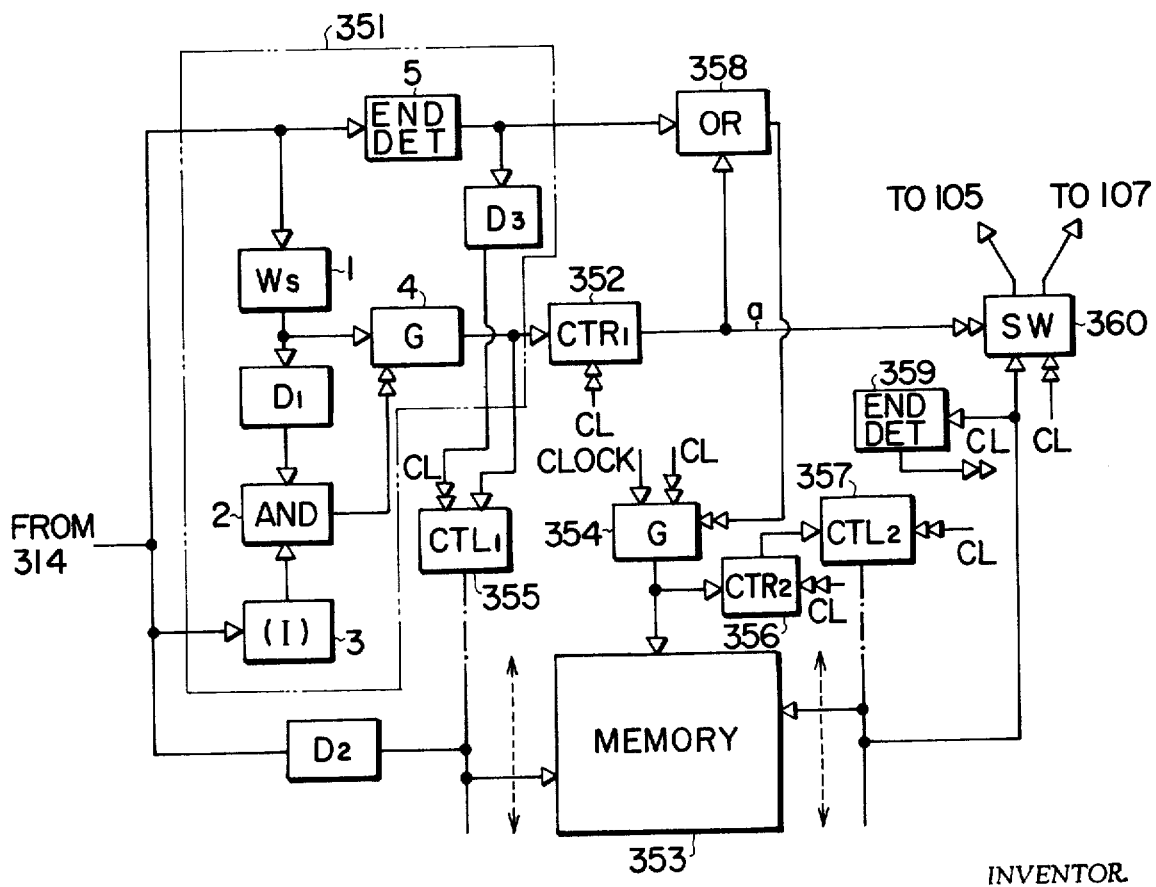
FIG. 11 is a diagram of the answer-counter in the central processor shown in FIG. 3B.

Referring to FIG. 11, answer counter 315 includes a detector portion 351 which detects the "starting block" and "ending block", with reference to FIGS. 2A–2D. Gate 351-4 is opened in response to the detection of a starting word $W_s$ in identifier 351-1 and an inquiry index format symbol (I or II) detected by identifier 351-3. Gate 352 is opened in response to a starting block (see FIG. 2D) to pass the second $W_s$ signal, that is, the starting word associated with the first data block in addition to the starting word associated with the second data block.

Counter 352 counts the number of data or entries flowing from file memory 104. A signal corresponding to each data block activates controller 355, which stores input data. Data are stored in memory 353 in order, that is, the starting block is stored in a first memory level while the first data block is stored in the second memory level, and so forth.

When counter 352 counts the data for identification, it generates an output signal to switch 360. Switch 360 has one output to desk addressing device 105 (in FIGS. 1 and 3B) and another output to high speed printer 107. Detector 351 identifies the end block or word with end detector 351-5. The output of the end detector 351-5 opens gate 354 through OR gate 358. Similarly, the output of counter 352 opens gate 354 through OR gate 358.

Clock pulses for data read-out pass through gate 354 to memory 353. The circuit paths are shifted by controller 357, which is activated by each output of counter 356. Counter 456 transmits an output signal corresponding to each data block cycle. When an end block is identified by detector 351-5 or when the contents of counter 352 exceeds zero, the read-out of memory 353 begins and continues until second end detector 359 identifies the end block or word in the output from memory 353. At that time, end detector 359 transmits a clear and stop signal to each element of the system.

If the number of entries retrieved exceeds or equals a predetermined quantity C, then all answers are transmitted to high speed output device 107 for rapid print-out. If, however, the number of answers is less than the quantity C, then the number is deemed few enough to be handled by the relatively slow desk printer unit 105. Therefore, the answers are transmitted to printer 105 via buffer 111 for print-out.

ERROR CORRECTION CIRCUITS 317 & 318

Figure 12:
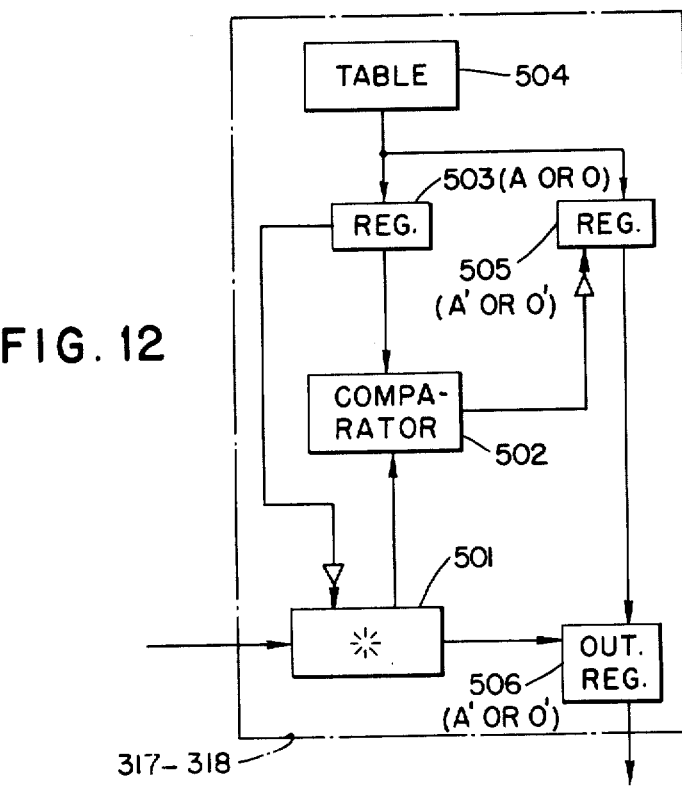
FIG. 12 is a logic block diagram of a conversion component.

Referring to FIG. 12, the operation of error correction circuits 217 and 318 is described in greater detail. Input inquiry information A or O containing an error, is first transmitted to input register 501 which separates the original numerical code A or O from the desk identifying code associated with the operator. The numerical code A or O is then transmitted to comparator 502, while the operator identification code is transmitted to output register 506. An error correction storage table 504 is serially scanned and its entries sequentially transmitted to registers 503 and 505. The information stored in memory 504 includes a list of correct A or O code entries together with the corresponding list of erroneous entries. These data are assembled empirically from experience showing that certain names or addresses, etc., are very often confused with others. Each pair of corresponding correct and incorrect entries are read out of memory 504 with the incorrect entry being stored in trial register 503, and the correct entry being stored in conversion register 505. Comparator 502 checks for coincidence between the trial erroneous entry in register 503 and the actual erroneous information in register 501. When there is coincidence, comparator 502 generates a signal to register 505 which, in turn, transmits the correct A or O information to register 506. The correct A or O information is then recombined with the operator desk identification code, as shown, and finally transmitted to circuit 319 (FIG. 3B) and recombined as a corrected inquiry index $I_q' = NA'O$ or $NAO'$, where a term having an apostrophe indicates that the term has been corrected.

Accordingly, circuit 317 or 318 serves to correct the most likely errors in request entered by the information operator, whether the error originated with the inquirer or with the operator. For example, if it has been found through experience that inquirers frequently confuse a postal zone corresponding to a particular location with the neighboring zone, correction circuit 316 is provided with a stored error correction table to correct this common error. On the other hand, if one occupation is often confused with a similar occupation, circuit 318 can be provided with a fixed table to correct the error in occupation.

At the end of a read-out cycle of error correction table 504, counter 503 reaches its maximum count and generates a pulse to clear register 501 and open a gate associated therewith. Since the re-retrieval circuitry, comprising circuits 316, 317 and 318 (FIG. 3B) includes no gate as does switching circuit 302, circuits 317 and 318 must independently open or close for a succeeding inquiry input A or O code. When circuits 317 and 318 have completed the information correction process, and converted the A and O information respectively to A' and O', circuit 316 generates a pulse to circuits 317 and 318. Circuits 317 and 318 transmit the A' or O' information to register 319 in the order NAO or NOA depending on the presence of end mark I or II.

When A' or O' information is entered into register 319 and combined with the original (unchanged) N information, circuit 319 transmits the corrected inquiry index $I_q'$ to register 273. Therein, a new cycle of search in memory 104 is initiated with the new inquiry index $I_q$ using the procedure previously described. When a response to the revised index $I_q$ is returned to $N_1$ checker 311, a second signal flows from $N_1$ checker 311 to no-answer gate 313 if there is still no answer from file memory 104 which corresponds to the inquiry information $I_q'$. No-answer gate 313 was previously primed by one input signal, as described supra. The second signal triggers gate 313 which sends a command signal via buffer 111 to typewriter desk printer 105 to print out a "no answer" response to the operator at desk 101.

ONE COORDINATE Z METHOD OF SEARCHING

Figure 13:
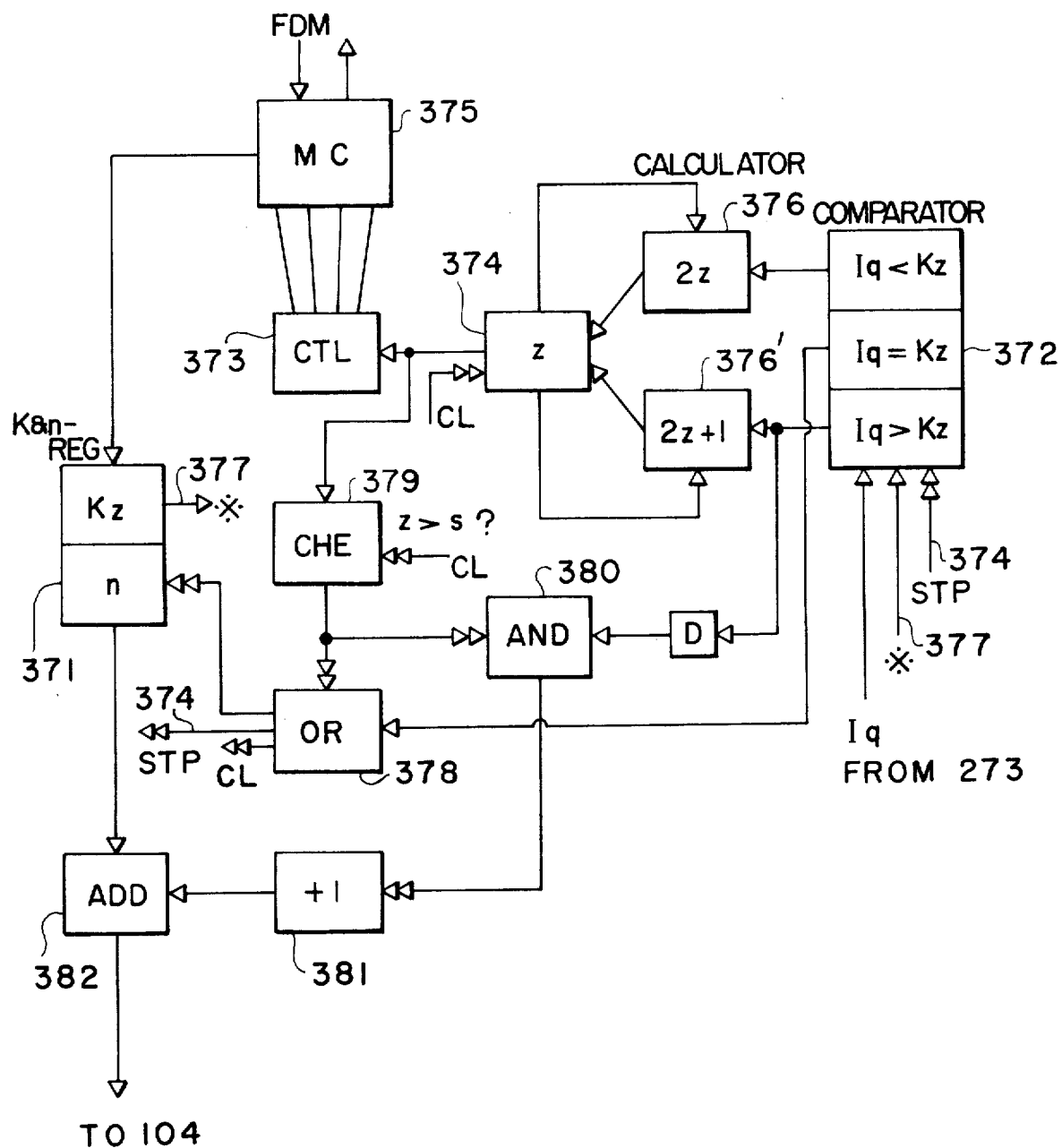
FIG. 13 is a logic block diagram of a comparing device for use in the one-coordinate method of searching.

Referring to FIG. 13, the operation of the circuit providing one coordinate Z searching is described in detail. As aforementioned, if the address number of core memory 201 is serially arranged, the consecutive number of the core address can be obtained by the formula $Z = 2^{z-1} + y - 1$ in FIG. 13, comparator 372, register 371 and core memory 375 correspond to units 272, 271 and 201, respectively, in FIG. 3A. Inquiry index $I_q$ enters comparator 912 from the output of register 273 (FIG. 3A) initiating read-out of core memory 375.

Z register 374 has an initial value logic 1, and calculator 376 doubles the initial value of Z ($1 \times 2 = 2$), and calculator 376' doubles the initial value of Z and adds 1 thereto ($1 \times 2 + 1 = 3$). Each result is registered in each of the calculators.

The content ($Z = 1$) of register 374 is transmitted to controller 373, which determines the core address of the first memory read-out. The content of memory 375, that is, $K(Z)$ and $n$, corresponding to the coordinate $Z = 1$, is stored in register 371. The relationship between $K(Z)$ and Z is as follows, wherein the numeral shown in parentheses is the address corresponding to $K(Z)$.

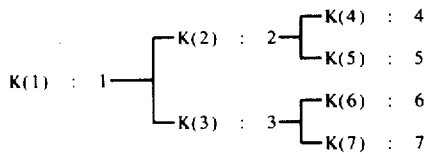

In the above table, the key word number is respectively $2^0, 2^1, 2^2, 2^3 \ldots 2^{m-1}$ respectively.

If the division point comparison comprises $m$ operations, the total number of key words $S_0$ is $$S_0 = \sum_{p=0}^{m-1} 2^p = 2^m - 1.$$

Accordingly, the largest value of Z cannot exceed the total number of key words $S_0$. The content of registers 376 or 376' lies between the values $2^m$ and ($2^{m+1} - 1$), therefore, the value exceeds $S_0 = 2^m - 1$.

At this time, Z checker 379 confirms that the value of Z exceeds $S_0$ after the last comparison is completed, and generates an output signal to OR gate 378. The remaining portions of the apparatus are the same as the corresponding portions described with respect to FIG. 3A.

GENERAL COMMENTS

This system has actually been tested in Japan and has resulted in a 300% increase in efficiency over conventional telephone information service, wherein the information operator looks up each number in a printed directory. In the present system, the operator does not have to type out the entire name of the desired subscriber, or even a substantial portion of it; it is sufficient if she types out only the fragmentary information represented by the search code $N_1 N_2 A_1 A_2 O_1 O_2$, which requires much less time.

In a look-up system of the prior art, wherein numbers are manually searched in a directory by an operator, it takes an average of 60 to 100 seconds to receive a telephone number from the information service, assuming a subscriber population of 1,500,000 to 2,000,000. In the system of the present invention, an answer is returned almost immediately, that is, within an average of 0.6 seconds after the operator has finished typing out the search code. In most cases, the operator receives just one answer for relay to the inquirer; occasionally, the operator receives more than one answer, but a large number of answers are almost never received.

It will therefore be appreciated if the invention provides rapid automatic retrieval of telephone information according to a novel and unique empirical approach to information storage and retrieval, wherein the information is stored and later retrieved according to the cross correlation of several mutually independent factors, i.e., primary and secondary name, primary and secondary addresses, and generic occupation. Furthermore, memory access during retrieval is random rather than serial, and thus the amount of search time to locate a particular memory address is minimized.

The present inventive concept, although described in conjunction with telephone information service, can also be used in an inventory control system. For example, in practical systems, the requrest for an item, such as a used automobile, does not always match the registered item, e.g., an automobile in stock. In such an event, the reguester would wish to have an item as close as possible to his original request. This is possible in the present invention by means of the generic classification of each item in the index. This invention, therefore, can be used in second hand car dealing, for example, whenever the customer can be satisfied with an automobile most similar to the one he requested.

For example, assuming that the features associated with the requested item are $a$, $b$, and $c$, while the features of the registered item (item contained in stock) are $a'$, $b'$, and $c'$. If the generic concept of $a$ and $a'$ is A, that is, $a$ and $a'$ are identified under a common genus description, and similarly, the generic concept of $b$ and $b'$ is B, and so forth, the relationship between the requested item and the requested item is as shown in the figure below.

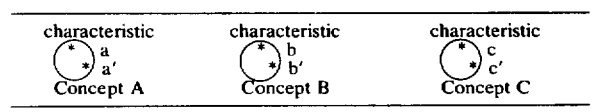

Assuming the features of the requested item are represented by the term $a + b + c = A + B + C$, where + indicates "intersection", the features of registered item $a' + b' + c' = A + B + C$, in generic classification, is true. If $A + B + C$ is adopted as an index, a small number of similar items can be retrieved. If secondary screening by $a$ or $b$ or $c$ is carried out, the most similar item is outputted as the desired item. For example, the outputted item may have the features of $a'$, $b'$, and $c'$. This was not possible in the prior art and accordingly, in the prior art, the number of entries retrieved was very large. Accordingly, the present invention is useful for real time retrievel using inaccurate or erroneous input information.

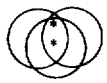

a+b+c
a'+b'+c'

APPENDIX I

The Rule of $N_1$

The following rules have been found helpful in choosing the name codes:

1. If the name of a subscriber includes a local area word and a proper noun, the proper noun is used for the principal name code $N_1$ in preference to the area word, since the latter merely duplicates the address information contained in the area code, or may even follow from the fact that a particular area telephone information office is called, as in "Miami Hilton Hotel."

2. If the name includes a function word and a proper noun, the proper noun is used in preference to the functional word for the principal name code $N_1$, since the functional word duplicates the information contained in the occupation code. For example, if the inquiry is for the telephone number of the Hotel Hilton, the code $N_1$ is based on the proper noun "Hilton", and not on the occupation-describing term "Hotel."

3. If the name comprises an area word plus a common noun which lacks distinctiveness, e.g. "Standard" or "General", then the area word is used as the basis for the principal name code $N_1$.

4. If the name comprises an area word plus an occupation word, e.g., "New York Trust CO.", then the area word is used as the basis for the principal name code $N_1$.

5. Where the name consists of an area word used to define a local branch office of a widespread enterprise, governmental or private, for example the New York District Headquarters of the Internal Revenue Service, then information seekers in the New York area are likely to ask simply for the Internal Revenue Service. Accordingly, the nominative portion "Internal Revenue Service" is used for name code preparation rather than the geographical portion "New York District Headquarters".

6. When the name includes a plurality of terms of foreign origin, e.g. "Sukiyaki/tei", name code $N_1$ is based on the first term, i.e. "Sukiyaki", and the second term "tei" is ignored, because the meaning of the foreign terms is lost anyway, and the simplest procedure is to use the beginning of the name.

7. If the name includes a surname plus an area word plus an occupation word (e.g. Miami Hilton Hotel), in any order, the surname has the greatest additional information content above and beyond the address concept and the occupational concept, and therefore is used as the basis of the principal name code $N_1$.

8. If the name consists of a surname plus an area word plus an occupation word, but the area designated by the area word is small so that it corresponds to the secondary area code $A_2$ rather than the primary area code $A_1$, then the name is cross-referenced. It is stored in one memory location using the surname as the primary name code $N_1$ and the area word as the secondary name code $N_2$, and it is also stored in another memory location using the area words as the primary name code $N_1$ and the surname as the secondary name code $N_2$.

9. Parentheses ( ) are used to indicate alternative codes. When an operator receives an inquiry and cannot determine which name word should be adopted as $N_1$, she enters the inquiry in the form of $N_1$ ($N_1'$), which, to the computer circuitry, means $N_1$ or $N_1'$. $N_1$ and $N_1'$ are alternative candidates for primary name code significance, either one of which may produce the desired answer.

10. When a diversified corporation has a number of divisions, each known by its own name, each of the divisions is recorded under its own name as well as under the name of the parent company.

APPENDIX II

Occupation Code

The following is a detailed example of occupation coding in a practical system according to this invention:

| CODE | | |
|---|---|---|
| Generic Code | | |
| Major Classification | Sub-Classification | Extract of Occupations |
| a | | Agriculture, forestry, gardening, fishing, ranching, etc. |
| | a-1 | Agriculture, forestry, ranching, feed. |
| | a-2 | Gardening. |
| | a-3 | Fishing, fishing tackle. |
| e | | Entertainment. |
| | e-1 | Entertainment enterprise. |
| | e-2 | Entertainment hall. |
| | e-3 | Entertainment equipment. |
| m | | Mining and metals. |
| | m-1 | Mining. |
| | m-2 | Metal refining. |
| | m-3 | Metal stock fabrication. |
| | m-4 | Metal processing. |
| | m-5 | Metal manufacture. |
| s | | Services. |
| | s-1 | Restaurant, hotel. |
| | s-2 | Barber. |
| | s-3 | Cleaning, garbage disposal. |
| | s-4 | Advertisement, design. |
| | s-5 | Research. |
| | s-6 | Advisory services. |
| | s-7 | Trustee. |
| | s-8 | Real property. |
| t | | Transporation, communication, information. |
| | t-1 | Transporation. |
| | t-2 | News. |
| | t-3 | Communication. |
| h | | Hospital, medical treatment, medicine. |
| | h-1 | Hospital, dispensary. |
| | h-2 | Medical treatment. |
| | h-3 | Medicine, medical articles. |
| k | | Chemical engineering, chemical products. |
| | k-1 | Chemical treatment, chemical products. |
| | k-2 | Chemicals, toilet goods, fertilizer. |
| | k-3 | Synthetic resins, synthetic fibers. |
| | k-4 | Oils and fats. |
| | k-5 | Gasses, paints, dyes. |
| n | | Machines, equipment, and parts. |
| | n-1 | Machines generally. |
| | n-2 | Food processing machines. |
| | n-3 | Vehicles. |
| | n-4 | Electrical machines, equipment, and tools. |
| | n-5 | Precision machinery, scientific machinery optical machinery, and tools. |
| | n-6 | Machines for spinning, sewing, mining and excavating. |
| | n-7 | Motors. |

-continued

| Generic Code | | |
|---|---|---|
| Major Classification | Sub- Classification | Extract of Occupations |
| | n-8 | Machine accessories. |
| | n-9 | Machine parts. |
| c | | Construction and excavation. |
| | c-1 | General construction. |
| | c-2 | Construction specialists, e.g. carpenters, etc. |
| | c-3 | Plant or facility construction. |
| f | | Foodstuffs. |
| | f-1 | Grains. |
| | f-2 | Meat, eggs, dairy products. |
| | f-3 | Farm products, marine products. |
| | f-4 | General foods (not in any other class). |
| | f-5 | Condiments. |
| | f-6 | Cakes and bread. |
| | f-7 | Luxury foods. |
| | f-8 | Foodstuffs industry; ice producers and dealers. |
| p | | Paper, stationary. |
| | p-1 | Pulp and paper. |
| | p-2 | Paper articles. |
| | p-3 | Stationary. |
| x | | Textiles, fibers and their products. |
| | x-1 | Fiber producers. |
| | x-2 | Fiber products. |
| | x-3 | Clothing. |
| l | | Light and fuel. |
| | l-1 | Electricity or gas service. |
| | l-2 | Other fuels. |
| g | | Rubber and leather. |
| | g-1 | Leather products. |
| | g-2 | Rubber products. |
| r | | Religion, culture, education. |
| | r-1 | Schools, cultural facilities. |
| | r-2 | Religious organizatons, funeral parlors. |
| | r-3 | Clubs. |
| i | | Financial, business, bank, pawnshop, insurance. |
| | i-1 | Financial business, bank, pawnshop. |
| | i-2 | Insurance, securities. |
| d | | Department stores, trade, art objects, articles. |
| | d-1 | Department stores, commercial enterprises. |
| | d-2 | Jewelry, art objects, trinkets. |
| | d-3 | Hobbies, tools and toys. |
| | d-4 | Notions, articles, accessories (buttons, snaps, zippers, hooks and eyes) |
| | d-5 | Second-hand dealers. |
| w | | Wood or bamboo products, furniture, ornaments. |
| | w-1 | Wood and wooden products. |
| | w-2 | Bamboo or rattan. |
| | w-3 | Furniture, furnishings, ornaments. |
| q | | Quarrying and ceramics. |
| | q-1 | Ceramics. |
| | q-2 | Quarrying products and construction materials. |
| b | | Graphic arts. |
| | b-1 | Prints. |
| | b-2 | Publishing, books. |
| | b-3 | Photography. |

For Example, Fine contents of the right column

| | |
|---|---|
| d-2 | Jewelry, art objects, trinkets. artistic handcraft, (including "curios") pictures and paintings (including "picture gallery") precious metals (including "jewelry") ivory pearl trinkets clock and watch glasses, embossed work. |

Note: Each sub-classification consists of such concrete breakdown details.

With reference to the foregoing table, the letter code for the generic classification, e.g., b for the graphic arts, is used as the principal occupation item $O_1$, and the number code for the sub-classification is the secondary occupation item $O_2$. In the case of a photographer, for example $O_1 O_2 = b3$.

What is claimed is:

1. An apparatus for providing telephone numbers in response to inquiries, comprising:
at least one input device for use by operators to supply inquiry information including a format control symbol for an inquiring index;
at least one output device for use by operators to receive information in response to inquiries;
at least one file memory device to which random access can be gained for storing data entries;
at least one central processor for carrying out a mathematical and logical computation, in particular a comparing operation, said central processor having:
an index shaping device coupled to said input device and comprising:
detector switching means to identify the breaks between items in the inquiry information and switch the items to registers for each said item,
register means connnected with said detector switching means for storing each said item, and to limit the number of characters as to any needed one of said items,
conversion means connected with said detector switching means for converting each of the needed items into a corresponding generic concept code,
a further register means connected with said conversion means for storing each of said generic concept codes,
an integrating register means connected with said register means and further register means to integrate each item to shape a set of inquiry items comprised of the inquiry index, a desk and question number, and a format control symbol, and
a directing means connected to said register means and said further register means parallel with said switching means to recognize a format-control symbol in the inquiry information to control the order of transmission of said generic codes from said further register means to said integrating register means;
a dividing device coupled to said integrating register means to separate the inquiry index from said set of inquiry items and to register said inquiry index;
a joining device coupled to the dividing device and the output channel of said file memory device to receive and combine the set of inquiry items with response data from the file memory device;
a comparison device, which comprises:
random access storage means having storage cells to store keywords that are prepared in the same format as the inquiry index item, and having a control unit,
a further storage means to store area-unit numbers corresponding to said keyboards and having storage cells corresponding to the storage cells in said random access storage means on a one for one basis,
comparing means coupled to both said storage means to determine the position of an inquiry index among a plurality of keywords, stored in the random access storage means, which respectively correspond to the storing areas of the file memory device, address calculating means connected with the comparing means and the control unit of the random access storage means, to calculate the memory address of the next keyword in accordance with a latest comparison result "larger" or "smaller" than the inquiry index, keyword registering means coupled between said random access storage means and said comparing means, to receive and store the keyword for the next comparison step, and area-built number registering means connected to the file memory device to receive and store area-unit numbers corresponding to the keywords, and to transmit the contents thereof to the file memory device at the time of determination of the inquiry index position among the keywords; and a checking device coupled between the joining device and the output device to determine whether or not a response received from the file memory device coincides with the inquiry index as to some particular items, to pass the coincident data to the output device, and to transmit a signal of "No-answer" to the output device when there is no coincident datum.

2. An apparatus as claimd in claim 1 in which said comparing means further comprises:

means to determine whether the inquiry index is larger than, or smaller than, or equal to each keyword, and to transmit signals representing the respective results;

said address calculating means further comprises:

an $x$-coordinate calculator connected between the control unit of the random access storage means and said comparing means the contents of which increase one by one at each comparison and which registers said contents, a $y$-register connected with the control unit of the random access storage means to register a calculated value at each step of comparison, a $y$-coordinate calculator coupled to the $y$-register to double the newly stored content of the $y$-register and to transmit the calculated value to said $y$-register in response to a signal from the comparing means that the inquiry index is larger than the keyword, a further $y$-coordinate calculator coupled to the $y$-register to double minus one the changed content of the $y$-register, and to transmit said calculated value to the $y$-register in response to a signal from the comparing means that the inquiry index is smaller than the keyboard, examining means coupled to the comparing means to accumulate one by one at each step of comparison, to examine whether or not the value of the accumulations reaches a predetermined value, and to transmit an output signal when the accumulated value reaches said predetermined value;

said random access storage means storing keywords on the basis of $x$- and $y$-coordinates which correspond respectively to each of the area-units of said file memory device;

said area-unit number registering means storing the area-unit number at each step of comparison, which area-unit number has a value according to the formula $t(2y-1)/2^x$ when $t$ is the number of all area-units in the file device;

OR-gate means coupled to the examining means and comparing means to which the outputs of said examining means and said comparing means are supplied and which transmits a signal to stop the comparing operation, a signal to clear some of the registering means, and a signal to command said area-unit number registering means to transmit the stored area-unit number to the file memory device;

AND-gate means to which the examining means and comparing means are coupled and to which the outputs of said examining means and said comparing means are supplied and which transmits a signal when the inquiry index is larger than the keyword, signal-generating means coupled to said AND-gate means to transmit a signal with value of "one"; and adjusting means coupled between said area-unit number registering means and said file memory device and to which said signal-generating means is coupled to adjust by "one" the area-unit number received from the area unit number registering means in response to a signal from said signal-generating means.

3. Apparatus as claimed in claim 1 in which said address calculating means further comprises:

a $z$-register connected with the control unit of said random access storage means to register a calculated value at each step of comparison, a $z$-coordinate calculator coupled to the $z$-register and said comparing means to receive and double the content of the $z$-register at each change of the contents thereof and to store this calculated value, and to feed said calculated value back to the $z$-register in response to a signal indicating that the inquiry index is smaller than the keyword.

a further $z$-coordinate calculator coupled to said $z$-register and said comparing means to double the content of said $z$-register and add "one" thereto at each change of the contents thereof and to store this calculated value, and to feed said calculated value back to the $z$-register in response to a signal indicating that the inquiry index is larger than the keyword, an OR-gate coupled to said file memory device and to said further comparing means, an AND-gate coupled to said file memory device, and examining means coupled between said $z$-register and said OR-gate and said AND-gate to determine whether or not the content of the $z$-register exceeds a predetermined value at each comparison, and to transmit a signal to the OR-gate when the content of the $z$-register exceeds said value and simultaneously transmit a signal to said AND-gate, said random access storing means having storing means and storing keywords in the sequential order of the $z$-coordinate value, having the relation $z=2^{x-1} + y-1$ to the $x$- and $y$-coordinates.

4. Apparatus as claimed in claim 1 further having means to determine finer areas in said file memory device which comprises:

dividing means forming part of said dividing device to divide a particular item from the set of inquiry items, to convert said particular item into an order number, and to transmit said order number, primary identifying means coupled to said integrating register means and in parallel with said dividing means to recognize the symbol indicating the boundary between the upper limit and lower limit of the particular item, and to generate a control signal, a calculating device which comprises a first multiplying means to multiply said order number by a particular integer which corresponds to the average value of the number of entries in an area unit, and a second means to decrease said order number by one and to multiply said decreased value by said integer and to increase the product of said multiplication by one, switching means connected between said dividing means and said calculating device, and connected to the primary identifying means and controlled by the output signal thereof to connect the input with both means in the calculating device when the primary identifying means does not recognize the boundary symbol in the particular item, and to switch to said first multiplying means in said calculating device only the upper limit value of the particular item, and then to switch to the second means in said calculating device only the lower limit value of the particular item when the primary identifying means does recognize the boundary symbol in said particular item, secondary identifying means coupled to said file memory device to recognize an overflow symbol in the response data from the file memory device, and to transmit the area-unit address for said overflow symbol to the file memory device for retrieveal of the rest of the entries, and tertial identifying means coupled to said joining device to determine whether or not the first datum of response has a symbol to indicate that said datum is overflowed from another area-unit of the file memory, and to transmit a "no-answer" signal upon recognition of said symbol.

5. Apparatus as claimed in claim 4 further comprising:

an index reforming device which comprises:
control register means coupled to said checking device to store the set of the inquiry items from said checking device, to separate each item, to transmit said each item to recognize the format control signal and transmit a signal for the arranged order of each item in accordance with the kind of said format control signal.

conversion means coupled to said control register means to receive each item therefrom and to find out the most likely mistaken concept corresponding to each item, and to transmit covered codes in accordance with the arranged order of each item, and an integrating register means to which the control register means and conversion means are coupled in turn couple to said dividing device to reform an inquiry index by integrating the converted codes for each of the inquiry items, and to transmit said reformed inquiry index to said dividing for researching; and "No-answer" means having one output coupled to said output device and a further output channel coupled to said index reforming device and having input channels coupled to said tertial identifying means and said checking device, to receive and memorize a "no-answer signal" from at least one of said tertial identifying means and said checking device so as to be primed to transmit a "no entry" signal to said output device, to feed back a signal to actuate said index reforming device, for the second retrival, and to be triggered by the second "no-answer" signal of the second retrival and to transmit a "no entry" answer to the output device after researching by the index reforming device.

* * * * *